(12) United States Patent
Asakawa et al.

(10) Patent No.: US 11,235,586 B2
(45) Date of Patent: Feb. 1, 2022

(54) INK JET PRINTING METHOD, INK JET PRINTING APPARATUS, AND INK JET HEAD

(71) Applicant: Seiko Epson Corporation, Tokyo (JP)

(72) Inventors: Yuta Asakawa, Azumino (JP); Akira Mizutani, Matsumoto (JP); Akiko Matsuzaki, Matsumoto (JP); Ippei Okuda, Shiojiri (JP)

(73) Assignee: Seiko Epson Corporation

( * ) Notice: Subject to any disclaimer, the term of this patent is extended or adjusted under 35 U.S.C. 154(b) by 8 days.

(21) Appl. No.: 16/525,670

(22) Filed: Jul. 30, 2019

(65) Prior Publication Data

US 2020/0039232 A1 Feb. 6, 2020

(30) Foreign Application Priority Data

Jul. 31, 2018 (JP) .............................. JP2018-143483

(51) Int. Cl.
*B41J 29/38* (2006.01)
*B41J 2/21* (2006.01)
*C09D 11/40* (2014.01)
*C09D 11/322* (2014.01)

(52) U.S. Cl.
CPC .............. *B41J 2/211* (2013.01); *B41J 2/2114* (2013.01); *C09D 11/322* (2013.01); *C09D 11/40* (2013.01); *B01F 2215/0059* (2013.01)

(58) Field of Classification Search
CPC .......... B41J 2/2114; B41J 2/2107; B41J 2/211
See application file for complete search history.

(56) References Cited

U.S. PATENT DOCUMENTS 8,083,339 B2 * 12/2011 Furukawa .............. B41J 2/2114
347/100
2002/0069789 A1 * 6/2002 Katsuragi .............. B41J 2/2107
106/31.27

FOREIGN PATENT DOCUMENTS

JP          2017-203077 A        11/2017

* cited by examiner

*Primary Examiner* — Lam S Nguyen
(74) *Attorney, Agent, or Firm* — Harness, Dickey & Pierce, P.L.C.

(57) ABSTRACT

An ink jet printing method includes scanning a printing medium in a scanning direction a plurality of times with an ink jet head from which inks and a treatment liquid acting to flocculate constituents of the inks are ejected. The ink jet head includes first ink nozzles filled with a first ink and arranged in a sub-scanning direction, second ink nozzles filled with a second ink having a different composition from the first ink and arranged in the sub-scanning direction, and treatment liquid nozzles filled with the treatment liquid and arranged in the sub-scanning direction. At least some of the treatment liquid nozzles are coincident in the sub-scanning direction with the first and second ink nozzles. The first ink nozzles are closest to the treatment liquid nozzles in the scanning direction, and the first ink exhibits a viscosity increase by a factor of 6.0 or less.

20 Claims, 3 Drawing Sheets

INK JET PRINTING METHOD, INK JET PRINTING APPARATUS, AND INK JET HEAD

The present application is based on, and claims priority from, JP Application Serial Number 2018-143483, filed Jul. 31, 2018, the disclosure of which is hereby incorporated by reference herein in its entirety.

BACKGROUND

1. Technical Field

The present disclosure relates to an ink jet printing method, an ink jet printing apparatus, and an ink jet head.

2. Related Art

There has been known an ink jet printing method for printing images on a printing medium by ejecting very small ink droplets through nozzles of an ejection head of an ink jet printing apparatus. The ink jet printing method has come into use for printing images not only on printing media absorbent of ink, such as plain paper, but also on printing media poorly absorbent of ink (hereinafter referred to as poorly ink-absorbent media), such as art paper and coated paper, and printing media not absorbent of ink (hereinafter referred to as ink-non-absorbent media), such as plastic films. In addition, aqueous ink jet ink compositions (hereinafter often referred to as aqueous ink or, simply, ink) mainly containing water come into use for printing images on such poorly absorbent or non-absorbent printing media.

For producing images having a high rub fastness and satisfactory image quality by printing using aqueous ink jet ink compositions, a technique is disclosed in which inks are used in combination with a treatment liquid capable of flocculating one or more constituents of the inks. The treatment liquid is often used for printing on poorly absorbent printing media and non-absorbent printing media, as disclosed in, for example, JP-A-2017-203077. Also, there has been known a serial printing method in which an ink jet printing head ejects ink on a printing medium while scanning the printing medium a plurality of times, that is, while relatively moving over the printing medium.

Unfortunately, in a serial printing method using aqueous inks and a treatment liquid, the ink nozzles arranged on a side in the scanning direction of the treatment liquid nozzles have a risk of being clogged.

SUMMARY

[1] According to an aspect of the present disclosure, there is provided an ink jet printing method including scanning a printing medium in a scanning direction a plurality of times with an ink jet head from which inks and a treatment liquid acting to flocculate one or more constituents of the inks are ejected. The ink jet head includes first ink nozzles filled with an ink and arranged in a sub-scanning direction intersecting the scanning direction, second ink nozzles filled with an ink having a different composition from the ink of the first ink nozzles and arranged in the sub-scanning direction, and treatment liquid nozzles filled with the treatment liquid and arranged in the sub-scanning direction. At least some of the treatment liquid nozzles are coincident in position in the sub-scanning direction with the first and the second ink nozzles. The first ink nozzles are the closest of the ink nozzles to the treatment liquid in the scanning direction. The second ink nozzles are arranged opposite the treatment nozzles in the scanning direction with respect to the first ink nozzles. When the ink of the first ink nozzles is mixed with a solution of 5% by mass of calcium acetate in water in a ratio of 2:1, the viscosity thereof increases by a factor of 6.0 or less relative to the viscosity before being mixed.

[2] In the ink jet printing method of [1], when the ink of the second ink nozzles is mixed with a solution of 5% by mass of calcium acetate in water in a ratio of 2:1, the viscosity thereof may increase by a factor of more than 6.0 relative to the viscosity before being mixed.

[3] In the ink jet printing method of [1] or [2], when the ink of the first ink nozzles is mixed with a solution of 5% by mass of calcium acetate in water in a ratio of 2:1, the viscosity thereof may increase by a factor of 3.5 or less relative to the viscosity before being mixed.

[4] In the ink jet printing method of any one of [1] to [3], the treatment liquid may be applied onto a printing region of the printing medium in a proportion from 20% by mass to 50% by mass relative to the mass of the inks applied onto the printing region.

[5] In the ink jet printing method of any one of [1] to [4], the ink of the first ink nozzles may be a pale ink composition, while the ink of the second ink nozzles is of the same color type as the pale ink composition and is different in color density from the pale ink composition.

[6] In the ink jet printing method of any one of [1] to [4], the ink of the first ink nozzles may be a clear ink composition, while the ink of the second ink nozzles is a coloring ink composition containing a coloring material.

[7] In the ink jet printing method of any one of [1] to [4], the ink of the first ink nozzles may be a white ink composition containing a white coloring material, while the ink of the second ink nozzles is a non-white ink composition containing a non-white coloring material.

[8] In the ink jet printing method of any one of [1] to [7], the ink jet head may further include third ink nozzles filled with an ink and arranged in the sub-scanning direction. The third ink nozzles are located opposite the first ink nozzles in the scanning direction with respect to the treatment liquid nozzles and are the closest of the ink nozzles opposite the first ink nozzles to the treatment liquid nozzles in the scanning direction. When the ink of the third ink nozzles is mixed with a solution of 5% by mass of calcium acetate in water in a ratio of 2:1, the viscosity thereof increases by a factor of 6.0 or less relative to the viscosity before being mixed.

[9] In the ink jet printing method of any one of [1] to [8], the ink jet head may further include ink nozzles filled with an ink opposite the first ink nozzles in the scanning direction with respect to the treatment liquid nozzles. The ink nozzles opposite the first ink nozzles include third ink nozzles located closest to the treatment liquid nozzles in the scanning direction, and fourth ink nozzles located opposite the treatment liquid nozzles in the scanning direction with respect to the third ink nozzles. When the ink of the third ink nozzles is mixed with a solution of 5% by mass of calcium acetate in water in a ratio of 2:1, the viscosity thereof increases by a factor of 6.0 or less relative to the viscosity before being mixed. When the ink of the fourth ink nozzles is mixed with a solution of 5% by mass of calcium acetate in water in a ratio of 2:1, the viscosity thereof increases by a factor of more than 6.0 relative to the viscosity before being mixed.

[10] In the ink jet printing method of any one of [1] to [7], the treatment liquid nozzles may include first treatment liquid nozzles and second treatment liquid nozzles with the first and the second ink nozzles therebetween in the scanning direction.

[11] In the ink jet printing method of any one of [1] to [7], the treatment liquid nozzles may be in an arrangement in the central one-third in the scanning direction of all the nozzles.

[12] In the ink jet printing method of any one of [1] to [11], the ink jet head may have a nozzle face at which the nozzles are arranged, and the nozzle face has a temperature of 28° C. to 50° C. when the inks are applied.

[13] In the ink jet printing method of any one of [1] to [12], the printing medium may be poorly or not absorbent of ink.

[14] In the ink jet printing method of any one of [1] to [13], the maximum period for one time of the scanning may 0.8 s or more.

[15] In the ink jet printing method of any one of [1] to [14], the treatment liquid may contain at least one of cationic resins, organic acids, and multivalent metal salts as a flocculant.

[16] In the ink jet printing method of any one of [1] to [15], the ink of the first ink nozzles and the ink of the second ink nozzles may contain a polyol having a normal boiling point of 280° C. or more as an organic solvent with a content of 1% by mass or less relative to the total mass of the ink.

[17] In the ink jet printing method of any one of [1] to [16], in the scanning of the printing medium performed in the scanning direction a plurality of times, the treatment liquid may be ejected from the portions of the treatment liquid nozzles coincident in position in the sub-scanning direction with the first and the second ink nozzles, and inks may be ejected from the portions of the first and the second ink nozzles coincident in position in the sub-scanning direction with the treatment liquid nozzles.

[18] According to another aspect of the present disclosure, an ink jet printing apparatus is provided. The ink jet printing apparatus includes an ink jet head operable to eject inks and a treatment liquid capable of flocculating one or more constituents of the inks while scanning a printing medium in a scanning direction a plurality of times. The ink jet head includes first ink nozzles that are to be filled with an ink and are arranged in a sub-scanning direction intersecting the scanning direction, second ink nozzles that are to be filled with an ink having a different composition from the ink of the first ink nozzles and that are arranged in the sub-scanning direction, and treatment liquid nozzles that are to be filled with the treatment liquid and are arranged in the sub-scanning direction. At least some of the treatment liquid nozzles are coincident in position in the sub-scanning direction with the first and the second ink nozzles. The first ink nozzles are the closest of the ink nozzles to the treatment liquid nozzles in the scanning direction, and the second ink nozzles are arranged opposite the treatment nozzles in the scanning direction with respect to the first ink nozzles. When the ink of the first ink nozzles is mixed with a solution of 5% by mass of calcium acetate in water in a ratio of 2:1, the ink of the first ink nozzles exhibits a viscosity increased by a factor of 6.0 or less relative to the viscosity before being mixed.

[19] The present disclosure also provides an ink jet head operable to eject inks and a treatment liquid capable of flocculating one or more constituents of the inks while scanning a printing medium in a scanning direction a plurality of times. The ink jet head includes first ink nozzles that are to be filled with an ink and are arranged in a sub-scanning direction intersecting the scanning direction, second ink nozzles that are to be filled with an ink having a different composition from the ink of the first ink nozzles and that are arranged in the sub-scanning direction, and treatment liquid nozzles that are to be filled with the treatment liquid and are arranged in the sub-scanning direction. At least some of the treatment liquid nozzles are coincident in position in the sub-scanning direction with the first and the second ink nozzles. The first ink nozzles are the closest of the ink nozzles to the treatment liquid nozzles in the scanning direction, and the second ink nozzles are arranged opposite the treatment nozzles in the scanning direction with respect to the first ink nozzles. When the ink of the first ink nozzles is mixed with a solution of 5% by mass of calcium acetate in water in a ratio of 2:1, the ink of the first ink nozzles exhibits a viscosity increased by a factor of 6.0 or less relative to the viscosity before being mixed.

DESCRIPTION OF EXEMPLARY EMBODIMENTS

Figure 1:
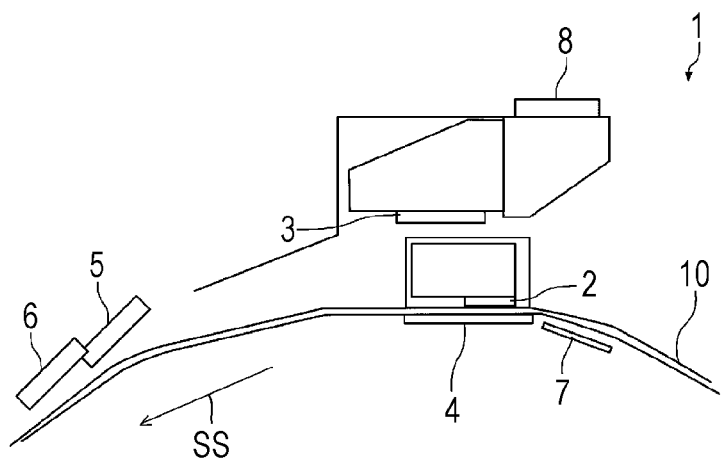
FIG. 1 is a schematic sectional view of an ink jet printing apparatus.

Exemplary embodiments of the present disclosure will now be described. The following embodiments will be described by way of example. The subject matter of the present disclosure can be implemented without being limited to the following embodiments, and various modifications may be made within the scope and spirit of the subject matter of the disclosure.

An ink jet printing method according to the present disclosure includes scanning a printing medium in a scanning direction a plurality of times with an ink jet head from which inks and a treatment liquid capable of flocculating one or more constituents of the inks are ejected. The ink jet head includes first ink nozzles filled with an ink and arranged in a sub-scanning direction intersecting the scanning direction, second ink nozzles filled with an ink having a different composition from the ink of first ink nozzles and arranged in the sub-scanning direction, treatment liquid nozzles filled with the treatment liquid and arranged in the sub-scanning direction. At least some of the treatment liquid nozzles are coincident in position in the sub-scanning direction with the first and the second ink nozzles. The first ink nozzles are the closest of the ink nozzles to the treatment liquid nozzles in the scanning direction, and the second ink nozzles are arranged opposite the treatment liquid nozzles in the scanning direction with respect to the first ink nozzles. When the ink of the first ink nozzles is mixed with a solution of 5% by mass of calcium acetate in water in a ratio of 2:1, the viscosity thereof increases by a factor of 6.0 or less relative to the viscosity before being mixed.

An ink jet printing apparatus according to the present disclosure includes an ink jet head operable to eject inks and a treatment liquid capable of flocculating one or more constituents of the inks while scanning a printing medium in a scanning direction a plurality of times. The ink jet head includes first ink nozzles that are to be filled with an ink and are arranged in a sub-scanning direction intersecting the scanning direction, second ink nozzles that are to be filled with an ink having a different composition from the ink of the first ink nozzles and that are arranged in the sub-scanning direction, and treatment liquid nozzles that are to be filled with the treatment liquid and are arranged in the sub-scanning direction. At least some of the treatment liquid nozzles are coincident in position in the sub-scanning direction with the first and the second ink nozzles. The first ink nozzles are the closest of the ink nozzles to the treatment liquid nozzles in the scanning direction, and the second ink nozzles are arranged opposite the treatment nozzles in the scanning direction with respect to the first ink nozzles. When the ink of the first ink nozzles is mixed with a solution of 5% by mass of calcium acetate in water in a ratio of 2:1, the viscosity thereof increases by a factor of 6.0 or less relative to the viscosity before being mixed.

An ink jet head according to the present disclosure is operable to eject inks and a treatment liquid capable of flocculating one or more constituents of the inks while scanning a printing medium in a scanning direction a plurality of times. The ink jet head includes first ink nozzles that are to be filled with an ink and are arranged in a sub-scanning direction intersecting the scanning direction, second ink nozzles that are to be filled with an ink having a different composition from the ink of the first ink nozzles and that are arranged in the sub-scanning direction, treatment liquid nozzles that are to be filled with the treatment liquid and are arranged in the sub-scanning direction. At least some of the treatment liquid nozzles are coincident in position in the sub-scanning direction with the first and the second ink nozzles. The first ink nozzles are the closest of the ink nozzles to the treatment liquid nozzles in the scanning direction, and the second ink nozzles are arranged opposite the treatment nozzles in the scanning direction with respect to the first ink nozzles. When the ink of the first ink nozzles is mixed with a solution of 5% by mass of calcium acetate in water in a ratio of 2:1, the viscosity thereof increases by a factor of 6.0 or less relative to the viscosity before being mixed.

Some embodiments of the ink jet printing method, the ink jet printing apparatus, and the ink jet head according to the present disclosure will be described through the descriptions of the ink jet printing apparatus, the ink jet head, the inks, the treatment liquid, the printing medium, and the ink jet printing method in this order.

1. COMPONENTS

1.1. Ink Jet Printing Apparatus

An ink jet printing apparatus used in the ink jet printing method according to an embodiment of the present disclosure will now be described with reference to the drawings.

Figure 2:
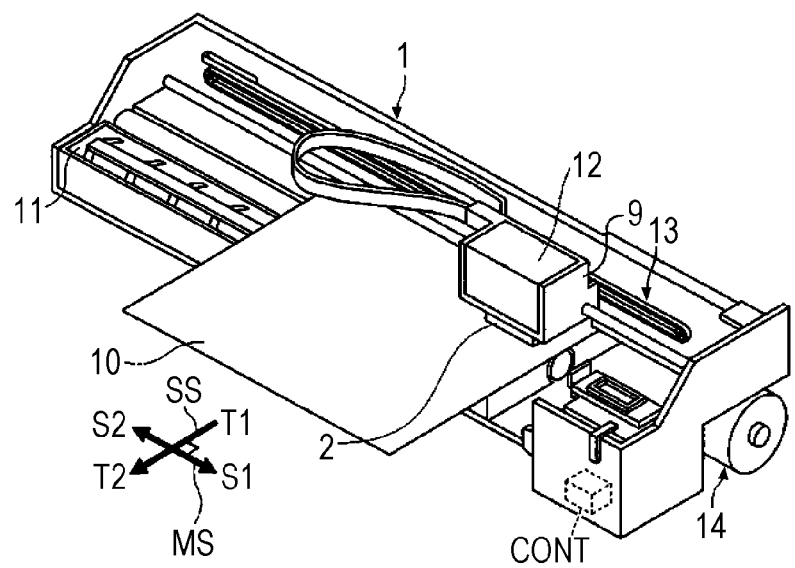
FIG. 2 is a perspective view illustrating a configuration of the carriage and the vicinity thereof of the ink jet printing apparatus shown in FIG. 1.

FIG. 1 is a schematic sectional view of an ink jet printing apparatus. FIG. 2 is a perspective view illustrating a configuration of the carriage and the vicinity thereof of the ink jet printing apparatus 1 shown in FIG. 1. As shown in FIGS. 1 and 2, the ink jet printing apparatus 1 includes an ink jet head 2, an IR heater 3, a platen heater 4, a secondary heater 5, a cooling fan 6, a preheater 7, a ventilation fan 8, a carriage 9, a platen 11, a carriage transfer mechanism 13, a transport unit 14, and a control unit CONT. The general operation of the ink jet printing apparatus 1 is controlled by the control unit CONT shown in FIG. 2.

The ink jet head 2 is a device configured to eject inks and a treatment liquid capable of flocculating one or more constituents of the inks through nozzles (see FIG. 3), thus applying the inks and the treatment liquid onto a printing medium 10. In the present disclosure, the ink jet head 2 is of a serial type that applies the inks and the treatment liquid onto the printing medium 10 while scanning the printing medium 10 in a scanning direction a plurality of times. The ink jet head 2 is mounted in the carriage 9 shown in FIG. 2. The ink jet head 2 scans the printing medium 10 in the scanning direction a plurality of times along with the operation of the carriage transfer mechanism 13 that transfers the carriage 9 in the width direction of the printing medium 10. The width direction of the printing medium is the scanning direction in which the ink jet head 2 scans the printing medium 10. A path or movement of the ink jet head 2 in the scanning direction is referred to as a scan.

Ejection of liquid from the ink jet head 2 may be performed by a known technique. For example, the ink jet head 2 may eject droplets by vibration of piezoelectric elements, that is, eject droplets formed by mechanical deformation of electrostrictive elements. The configuration of the ink jet head 2 and the carriage 9 and the vicinity thereof will be described in detail later herein.

The ink jet printing apparatus 1 includes the IR heater 3 and the platen heater 4 that are operable to heat the printing medium 10 when the inks and the treatment liquid are ejected from the ink jet head 2, that is, operable for primary heating or primary drying. In the present disclosure, when the printing medium 10 is heated in the ink application step described later herein, at least one of the IR heater 3 and the platen heater 4 is used.

When the IR heater 3 is used, the printing medium 10 is heated from the side on which the ink jet head 2 is located. In this instance, the ink jet head 2 is likely to be heated simultaneously with the printing medium 10, and, however, the inks and the treatment liquid can be efficiently heated without interference of the thickness of the printing medium 10, unlike when the platen heater 4 or the like heats the printing medium 10 from the rear side. When the platen heater 4 is used for heating the printing medium 10, the printing medium 10 is heated from the opposite side to the ink jet head 2. In this instance, the ink jet head 2 is less likely to be heated.

The upper limit of the surface temperature of the printing medium 10 heated by the IR heater 3 and/or the platen heater 4 may be 45° C. or less, for example, 40° C. or less, 38° C. or less, or 35° C. or less. Also, the lower limit of the surface temperature of the printing medium 10 may be 25° C. or more, for example, 28° C. or more, 30° C. or more, or 32° C. or more. In this instance, the ink compositions in the ink jet head 2 are little or not affected by the radiant heat from the IR heater 3 and the platen heater 4. Thus, the ink compositions are unlikely to be dried or deteriorated, and the inks or the resin in the inks are unlikely to adhere to the inner wall of the ink jet head 2. Also, the ink is rapidly solidified to increase image quality.

The secondary heater 5 is operable to dry or solidify the ink applied onto the printing medium 10, that is, acts as an auxiliary heater or dryer. The secondary heater 5 heats the image printed on the printing medium 10 to rapidly evaporate the water or any other solvent from the ink in the image, so that the resin remaining in the ink forms an ink coating film. Thus, the ink coating film is firmly fixed or adheres to the printing medium 10, thus forming a high-quality image in a short time. The upper limit of the surface temperature of the printing medium 10 heated by the secondary heater 5 may be 120° C. or less, for example, 100° C. or less or 90° C. or less. Also, the lower limit of the surface temperature of the printing medium 10 at this time may be 60° C. or more, for example, 70° C. or more or 80° C. or more. By controlling the surface temperature of the printing medium in such a range, high-quality images can be formed in a short time.

The ink jet printing apparatus 1 may include a cooling fan 6. By cooling the ink applied onto the printing medium 10 with the cooling fan 6 after drying, the ink can form an ink coating film on the printing medium 10 with a high adhesion.

The ink jet printing apparatus 1 may also include a preheater 7 operable to previously heat the printing medium 10 before the ink is applied onto the printing medium 10. Furthermore, the ink jet printing apparatus 1 may include a ventilation fan 8 operable to efficiently dry the ink or the treatment liquid applied onto the printing medium 10.

Below the carriage 9, a platen 11, a carriage transfer mechanism 13, and a transport unit 14 are disposed. The platen 11 transports the printing medium 10. The carriage transfer mechanism 13 transfers the carriage 9 relative to the printing medium 10. The transport unit 14 is a roller operable to transport the printing medium 10 in the sub-scanning direction. A control unit CONT controls the operations of the carriage transfer mechanism 13 and the transport unit 14.

1.2. Ink Jet Head

In the present disclosure, the ink jet head 2 is operable to apply the inks and the treatment liquid onto the printing medium 10 while being transferred by the movement of the carriage 9. The ink jet head 2 thus scans the printing medium 10 for printing in a scanning direction a plurality of times.

In the present embodiment, the scanning direction is a direction in which the carriage 9 in which the ink jet head 2 is mounted moves. In FIG. 1, the scanning direction intersects the sub-scanning direction indicated by arrow SS that is the direction in which the printing medium 10 is transported. In FIG. 2, the width direction of the printing medium 10, that is, the S1-S2 directions are the scanning direction MS, and the T1→T2 direction is the sub-scanning direction SS. When the ink jet head 2 scans the printing medium once, the ink jet head 2 moves in a scanning direction, that is, toward either the right side or the left side of the ink jet printing apparatus 1. By alternately repeating such scanning operation by the ink jet head 2 and sub-scanning operation for transport the printing medium 10, images are printing on the printing medium 10.

In the embodiment disclosed herein, the cartridge 12 operable to feed inks and the treatment liquid to the ink jet head 2 includes a plurality of cartridges independent from each other. The cartridge 12 is removably mounted on the cartridge 9 equipped with the ink jet head 2. Each of the cartridges contains a different type of ink or the treatment liquid, and the inks and the treatment liquid are fed to the nozzles from the respective cartridges 12. Although the embodiment disclosed herein illustrates the cartridge 12 mounted on the carriage 9, a cartridge of an embodiment may be disposed at a position other than the carriage 9 so that the inks and the treatment liquid can be fed to the nozzles through a feed tube (not shown).

Figure 3:
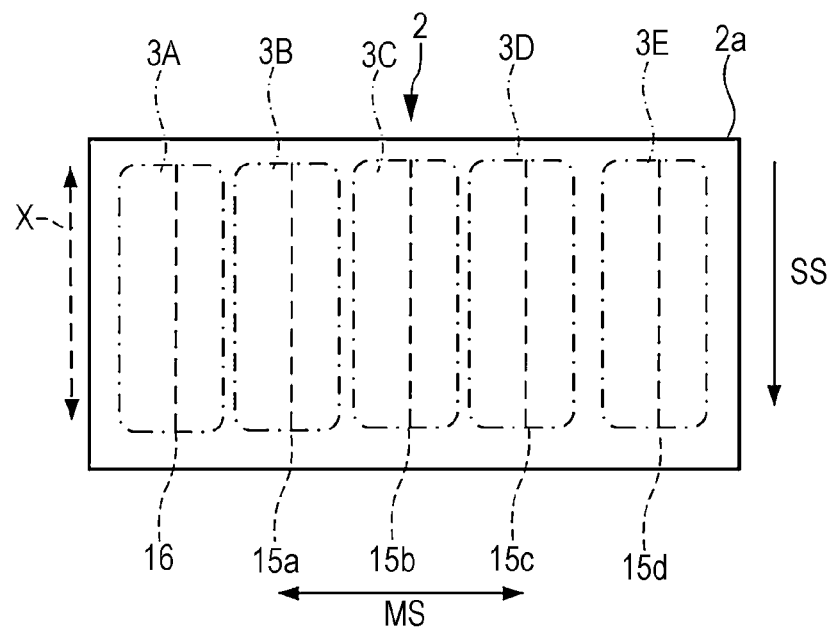
FIG. 3 is a schematic top view illustrating a nozzle arrangement of an ink jet head.

FIG. 3 illustrates an example of the nozzle arrangement at a surface (hereinafter referred to as a nozzle face) 2a of the ink jet head 2. The ink jet head 2 has a nozzle face 2a having a plurality of nozzles through which the inks and the treatment liquid are ejected. In the embodiment shown in FIG. 3, the nozzle face 2a of the ink jet head 2 has ink nozzles grouped into 15a, 15b, 15c, and 15d and treatment liquid nozzles 16. The ink nozzles in each group are filled with an ink and arranged in the sub-scanning direction. The treatment liquid nozzles are filled with the treatment liquid and arranged in the sub-scanning direction. The treatment liquid nozzles 16 may be arranged in a single line or a plurality of lines. In the embodiment shown in FIG. 3, the treatment liquid nozzles 16 are arranged in a single line. In FIG. 3, MS represents the scanning direction.

In the embodiment shown in FIG. 3, the treatment liquid nozzles 16 are coincident in position in the sub-scanning direction with the groups 15a, 15b, 15c, and 15d of the ink nozzles. Nozzles "coincident" in this instance refers to the nozzles within the range represented by X in FIG. 3. X also represents the length in the sub-scanning direction of the coincident region in which the region 3A including the treatment nozzles 15 is coincident with regions 3B, 3C, 3D, and 3E including the ink nozzles 15a, 15b, 15c, and 15d, respectively. In the embodiment shown in FIG. 3, the coincident region X accounts for 100% of the length of the arrangement of the treatment liquid nozzles 16 in the sub-scanning direction and also accounts for 100% of the length of the groups 15a, 15b, 15c, and 15d of the ink nozzles arranged in the sub-scanning direction. When the coincident region X accounts for a large part of the length of the nozzle arrangement in the sub-scanning direction as in the above embodiment, the treatment liquid and the inks can be simultaneously ejected in one scan, and accordingly, printing speed is increased.

Figure 4:
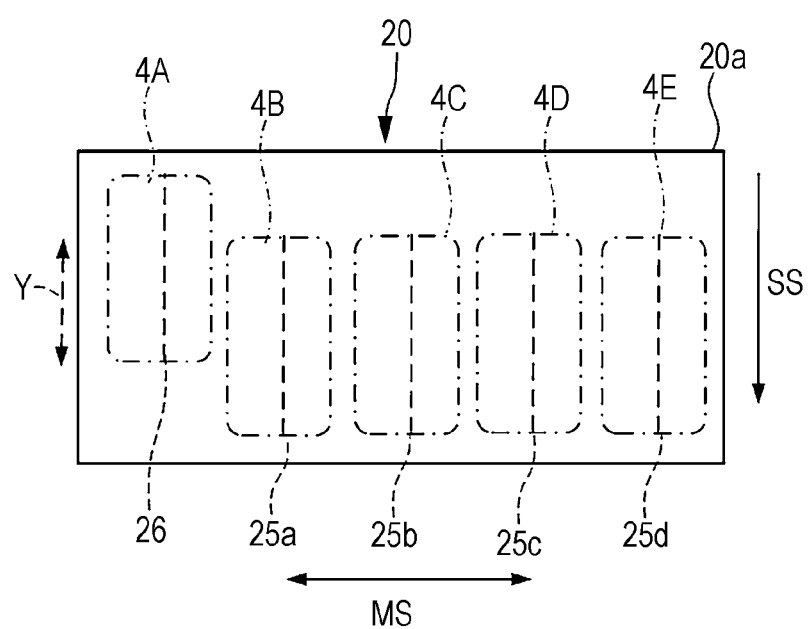
FIG. 4 is a schematic top view illustrating another nozzle arrangement of an ink jet head.

FIG. 4 shows another arrangement of nozzles. In the embodiment shown in FIG. 4, the nozzle face 20a of an ink jet head 20 has ink nozzles grouped into 25a, 25b, 25c, and 25d and treatment liquid nozzles 26. The ink nozzles in each group are filled with an ink and arranged in the sub-scanning direction. The treatment liquid nozzles are filled with the treatment liquid and arranged in the sub-scanning direction. Some of the treatment liquid nozzles 26 are coincident in position in the sub-scanning direction with the ink nozzles 25a, 25b, 25c, and 25d. Nozzles "coincident" in this instance refers to the nozzles within the range represented by Y in FIG. 4. Y also represents the length in the sub-scanning direction of the coincident region in which the region 4A including the treatment liquid nozzles 26 is coincident with regions 4B, 4C, 4D, and 4E including the ink nozzles 25a, 25b, 25c, and 25d, respectively. In the embodiment shown in FIG. 4, the coincident region Y accounts for about $2/3$ of the length of the arrangement of the treatment liquid nozzles 26 in the sub-scanning direction and also accounts for about $2/3$ of the length of the groups 25a, 25b, 25c, and 25d of the ink nozzles arranged in the sub-scanning direction. When the coincident region Y accounts for a part of the length of each nozzle group extending in the sub-scanning direction as in the above embodiment, part of the treatment liquid and inks can be simultaneously ejected in one scan. In this instance, since the inks are applied after the treatment liquid has been dried to some extent, image quality is likely to be increased. However, the length of each nozzle group extending in the sub-scanning direction is reduced to smaller than that in the embodiment shown in FIG. 3, and accordingly, the printing speed is reduced to lower than that in the case shown in FIG. 3.

In the embodiment shown in FIG. 4, the treatment liquid nozzles 26 are located more upstream than the ink nozzles 25a, 25b, 25c, and 25d. When the length of each nozzle group extending in the sub-scanning direction is increased to the same length as in FIG. 3 in this nozzle arrangement, the size of the apparatus including the carriage 9 or the like is likely to be increased in the sub-scanning direction, compared to the case shown in FIG. 3.

In the embodiment shown in FIG. 3, the treatment liquid nozzles 16 are located at the left end of the nozzle face 2a. The closest of the ink nozzles 15a, 15b, 15c, and 15d to the treatment liquid nozzles 16 in the scanning direction, that is, the ink nozzles 15a, are defined as first ink nozzles. The ink nozzles 15a are filled with an ink having a viscosity that will increase by a factor of 6.0 or less when the ink is mixed with a solution of 5% by mass of calcium acetate in water in a ratio of 2:1. By arranging the nozzles in such a manner for serial printing, the ink nozzles 15a prevent the treatment liquid from mixing with ink even if the mist of the treatment liquid is scattered in the scanning direction. Also, the ink ejected from the ink nozzles 15a hinders the mist of the treatment liquid from reaching the other groups 15b and so on of the ink nozzles. Thus, the occurrence of foreign matter is reduced at the ink nozzles 15b and so on other than the ink nozzles 15a, reducing the clogging of the nozzles.

The ink fed to the ink nozzles 15a may have a viscosity that will increase by a factor of 3.5 or less, for example, 3.3 or less, 2.7 or less, or 2.4 or less relative to the initial viscosity, when mixed with a solution of 5% by mass of calcium acetate in water in a ratio of 2:1.

The ink nozzles 15b, 15c, and 15d are disposed opposite the treatment liquid nozzles 16 with respect to the ink nozzles 15a. The ink nozzles 15b, 15c, and 15d include second ink nozzles. For example, in the embodiment shown in FIG. 3, the ink nozzles 15b closest in the scanning direction to the ink nozzles 15a may be defined as the second ink nozzles. The ink fed to the ink nozzles 15b that is the second ink nozzles may have a viscosity that will increases by a factor of more than 6.0 relative to the initial viscosity when mixed with a solution of 5% by mass of calcium acetate in water in a ratio of 2:1. In this instance, since the ink nozzles 15a is located between the ink nozzles 15b and the treatment liquid nozzles 16, the ink nozzles 15b are not clogged even if the mist of the treatment liquid is scattered in the scanning direction.

As just described, in the arrangement in which the ink nozzles 15a filled with an ink poorly reactive with the treatment liquid are located close to the treatment liquid nozzles 16, while the ink nozzles 15b filled with an ink more reactive than the ink of the ink nozzles 15a with the treatment liquid are located far from the treatment liquid nozzles 16, clogging of the nozzles is reduced.

In the arrangement shown in FIG. 3, the treatment liquid nozzles 16 are located at the left end of the figure. In an embodiment, however, the treatment liquid nozzles may be arranged at the center of the figure, and the ink nozzles that are first and third ink nozzles are arranged on both sides of the arrangement of the treatment liquid nozzles. In this instance, the inks fed to the ink nozzles on both sides of the arrangement of the treatment liquid nozzles have a viscosity that will increase by a factor of 6.0 or less relative to the initial viscosity when mixed with a solution of 5% by mass of calcium acetate in water in a ratio of 2:1. Also, in such an arrangement, the inks fed to the ink nozzles in each line opposite the line of the first or the third ink nozzles in the scanning direction with respect to the arrangement of the treatment liquid nozzles, that is, the inks fed to the second and the fourth ink nozzles, may have a viscosity that will increase by a factor of more than 6.0 relative to the initial viscosity when mixed with a solution of 5% by mass of calcium acetate in water in a ratio of 2:1. By arranging the ink nozzles in such a manner, clogging of the ink nozzles is reduced.

In such an arrangement, the treatment liquid nozzles may be in an arrangement in the central one-third in the scanning direction of all the nozzles. For example, when the nozzles are arranged in 12 lines, the treatment liquid nozzles may be arranged in any of the central four lines. In some embodiments, the treatment liquid nozzles may be in an arrangement in the central one-fourth, one-fifth, or one-sixth of the nozzles.

In the arrangement shown in FIG. 3, the treatment liquid nozzles 16 are located at the left end of the figure. In an embodiment, however, the treatment liquid nozzles may be disposed at the right end, on the opposite side to the treatment liquid nozzles 16 shown in the figure. In this instance, when the ink fed to the ink nozzles adjacent to the treatment liquid nozzles at the right end is mixed with a solution of 5% by mass of calcium acetate in water in a ratio of 2:1, the viscosity of the ink increases by a factor of 6.0 or less relative to the viscosity before being mixed.

In an embodiment, in addition to the treatment liquid nozzles 16 shown in FIG. 3, further treatment liquid nozzles may be arranged at the right end, on the opposite side to the treatment liquid nozzles 16. More specifically, two lines of treatment liquid nozzles may be arranged with a plurality of lines of ink nozzles therebetween. In this instance, it is beneficial to fill the ink nozzles in each line adjacent to the treatment liquid nozzles with an ink having a viscosity that increases by the smallest factor. By arranging the ink nozzles in such a manner, clogging of the ink nozzles is reduced.

Figure 5:
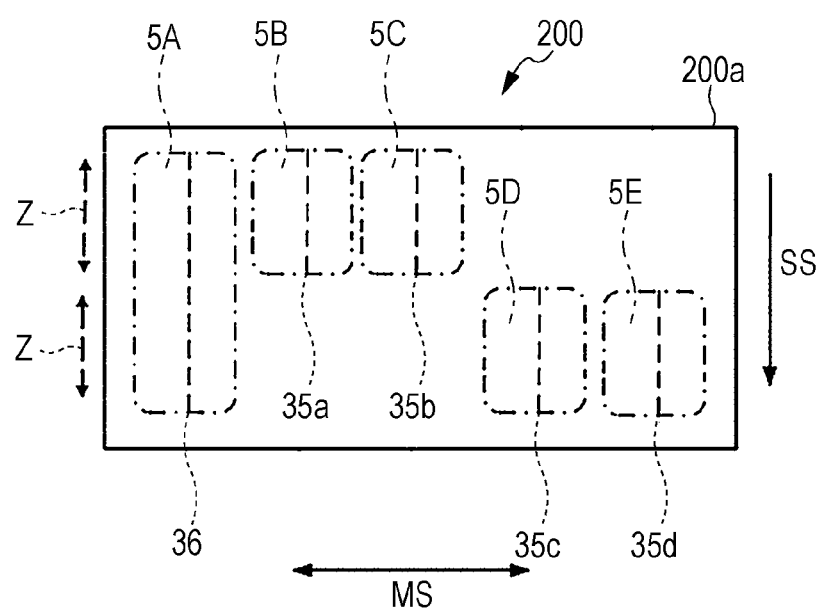
FIG. 5 is a schematic top view illustrating still another nozzle arrangement of an ink jet head.

FIG. 5 shows still another arrangement of the nozzles. In the arrangement shown in FIG. 5, the nozzle face 200a of an ink jet head 200 has treatment liquid nozzles 36 and ink nozzles grouped into 35a, 35b, 35c, and 35d. The groups 35a to 35d of the ink nozzles are each coincident in position of the sub-scanning direction with some of the treatment liquid nozzles 36. Nozzles "coincident" in this instance refers to the nozzles within either range represented by Z in FIG. 5. Z also represents the length in the sub-scanning direction of the coincident region in which the region 5A including the treatment liquid nozzles 36 is coincident with any of the regions 5B to 5E including the ink nozzles 35a to 35d, respectively. In this arrangement, the ink nozzles 35a and 35b are arranged upstream in the sub-scanning direction, and the ink nozzles 35c and 35d are arranged downstream in the sub-scanning direction. In such an arrangement, the ink nozzles 35a and 35b are not coincident in position in the sub-scanning direction with the ink nozzles 35c and 35d.

In the arrangement shown in FIG. 5, the inks ejected from the ink nozzles in the groups not coincident with each other in the sub-scanning direction are not applied onto the same region on the printing medium in a scan. For example, the ink in the ink nozzles 35a may be applied onto a region in a scan, and the ink in the ink nozzles 35c may be applied onto the region in another scan. In this instance, the inks in the ink nozzles 35a and the ink nozzles 35c are applied onto different regions of a printing medium, and after a period of time for one scan has passed, those regions receive the other of the inks. Thus, inks are not likely to cause color mixing on the printing medium. For example, the ink nozzles 35a may be filled with a white ink, and the ink nozzles 35c may be filled with a non-white ink.

In the arrangement shown in FIG. 5, the ink nozzles 35a and 35b are arranged upstream in the sub-scanning direction, and the ink nozzles 35c and 35d are arranged downstream in the sub-scanning direction so as not to be coincident in the sub-scanning direction with the ink nozzles 35a and 35b. In such an arrangement, any group of the ink nozzles may be arranged upstream independent of other groups or may be arranged downstream. Also, the number of groups of the ink nozzles arranged upstream and the number of groups of the ink nozzles arranged downstream are not limited to those disclosed herein.

In another embodiment, the treatment liquid nozzles may be located more upstream than the ink nozzles in the sub-scanning direction, as shown in FIG. 4, and, in addition, the ink nozzles arranged as shown in FIG. 4 are arranged in such a manner that some of the ink nozzles are located more upstream than the other in the sub-scanning direction, as shown in FIG. 5. In this instance as well, it is beneficial to arrange the nozzles in such a manner that each group of the ink nozzles 35a to 35d is at least partially coincident in position in the sub-scanning direction with the treatment liquid nozzles 36. Such an arrangement has both features of the arrangement shown in FIG. 4 and the arrangement shown in FIG. 5.

In the embodiments shown in FIGS. 3 to 5, the treatment liquid nozzles and the ink nozzles are arranged at the nozzle face of the ink jet head, and all the groups of the nozzles may be used for printing. Alternatively, some of the groups of the nozzles arranged at the nozzle face of the ink jet head may be selected for printing. In this instance, the selected groups of the nozzles may be arranged as in any of the arrangements shown in FIGS. 3 to 5. When selected groups of the nozzles are used, the nozzles in the selected groups are the nozzles described in the embodiments of the present disclosure.

1.3. Ink

The inks used in the ink jet printing method of the present disclosure will now be described.

The inks used in the embodiments according to the present disclosure are used for ink jet printing, together with the treatment liquid capable of flocculating one or more constituents of the inks. Aqueous ink jet ink compositions containing water as the major constituent may be used as such inks.

The inks used in the embodiments according to the present disclosure constitute an ink set including a poorly reactive ink and a reactive ink. When these inks are mixed with a solution of 5% by mass of calcium acetate in water in a ratio of 2:1, the poorly reactive ink exhibits a viscosity increased by a factor of 6.0 or less relative to the viscosity before being mixed, and the reactive ink exhibits a viscosity increased by a factor of more than 6.0 relative to the viscosity before being mixed.

The poorly reactive ink of the ink set may be a pale ink composition that is fed to the ink nozzles 15a. The reactive ink that is fed to the ink nozzles 15b may be a deep ink composition that is of the same color type as the pale ink composition but is different in color density from the pale ink composition.

The poorly reactive ink may be a clear ink composition (hereinafter often simply referred to as a/the clear ink), and the reactive ink may be a coloring ink composition containing a coloring material (hereinafter often simply referred to as a/the color ink).

In an embodiment, the poorly reactive ink may be a white ink composition containing a white coloring material (hereinafter often simply referred to as a/the white ink), and the reactive ink may be a non-white ink composition containing a non-white coloring material. The non-white ink composition is a color ink other than white ink.

An ink jet ink composition mentioned herein is an ink composition used in an ink jet printing method. An "aqueous" composition mentioned herein denotes a composition containing water as one of the major solvents. The water content in the ink composition may be 40% by mass or more and is beneficially 45% by mass or more, for example, 50% by mass or more or 60% by mass or more. In an embodiment, the ink compositions may have the same composition as each other, except that the hue angles vary among ink composition due to the use of different coloring materials.

In an embodiment, the inks may or may not contain an organic solvent, and the content of the organic solvent in the ink compositions may be 30% by mass or less, for example, 25% by mass or less or 20% by mass or less, relative to the total mass of the ink composition. The ink compositions may optionally contain a coloring material, a resin, a wax, an antifoaming agent, or a surfactant.

The constituents in the inks used in the embodiments according to the present disclosure will now be described.

1.3.1. Water

In the embodiments according to the present disclosure, the inks contain water. The water is a dominant medium of the inks and is evaporated by drying. Beneficially, the water is pure water or ultra-pure water from which ionic impurities are removed as much as possible. Examples of such water include ion exchanged water, ultrafiltered water, reverse osmosis water, and distilled water. Sterile water prepared by, for example, UV irradiation or addition of hydrogen peroxide may be used. Sterile water can reduce the occurrence of mold or bacteria and the use thereof is beneficial for storing the aqueous ink composition for a long period.

The water content may be 40% by mass or more, for example, 50% by mass or more or 60% by mass or more, relative to the total mass of the ink. The upper limit of the water content may be, but is not limited to, for example, 99% by mass or less.

1.3.2. Coloring Materials

The ink set used in an embodiment of the present disclosure may include a plurality of color inks containing a coloring material as described above or may be a combination of a clear ink and at least one color ink.

The coloring material may be a dye or a pigment. Pigments are resistant to fading caused by light or gases and are accordingly beneficial. Images formed on a printing medium with pigment are resistant to water, gases, and light and, accordingly, can be stably stored. Such features are apparent particularly when images are formed on a poorly ink-absorbent or non-ink-absorbent printing medium. In an embodiment, when the ink set includes a pale ink composition and a deep ink composition, the ink compositions may contain the same coloring material or different coloring materials.

Inks of the "same color type" denote any of the following:

(A) A combination of, for example, a cyan ink and a light cyan ink (often called photo cyan ink); a magenta ink and a light magenta ink (often called photo magenta ink); a yellow ink and a dark yellow ink; a black ink and a gray ink; or any other combination of inks that are considered to be the same color type from the names thereof.

(B) A combination of a pale ink composition and a deep color composition, wherein an image printed on a white printing medium with a pale ink composition and an image printed on the white printing medium with a deep ink composition have a difference in hue angle $\angle H°$ of 30° or less. The hue angle $\angle H°$ is defined in the CIELAB color space and calculated by any of the equations: $\angle H° = \tan^{-1}(b^*/a^*) + 180$ (in the case of $a^* < 0$); and $\angle H° = \tan^{-1}(b^*/a^*) + 360$ (in the case of $a^* > 0$), wherein $a^*$ and $b^*$ represent parameters of perceived chromaticity specified by the CIELAB color space. Printed images mentioned here are those printed, for example, at a rate of 10 mg/inch$^2$ so as to be suitable to perceive the color of the ink. The color of printed images is measured with a colorimeter according to the CIELAB color scale. The difference in hue angle ∠H° may be 10° or less and is beneficially 5° or less.

(C) A combination of inks containing a coloring material belonging to the same color category when the coloring materials are classified into categories, such as yellow coloring material, cyan coloring material, magenta coloring material, and black coloring material, by the color. Beneficially, inks of the same color type contain the same coloring material.

A combination of pale and deep ink compositions of the same color type denotes any of the following:

(A) Ink compositions containing the same coloring material with different contents in terms of mass. For example, in a combination of a pale ink composition and a deep ink composition, the ink composition containing the coloring material with the higher content is the deep ink composition, and the ink composition containing the coloring material with the lower content is the pale ink composition.

(B) Ink compositions imparting different image densities to images printed therewith in the same amount. In this instance, pale or deep is determined by lightness L*. In this instance, image printing and color measurement are made as described above. The ink composition imparting the higher image density is the deep ink composition, and the ink composition imparting the lower image density is the pale ink composition.

Pigments that can be used herein include, but are not limited to, inorganic pigments and organic pigments. Exemplary inorganic pigments include titanium oxide, iron oxide, and carbon blacks produced by known methods, such as the contact method, the furnace method, and the thermal method. Exemplary organic pigments include azo pigments, polycyclic pigments, nitro pigments, nitroso pigments, and aniline black. Azo pigments include azo lake, insoluble azo pigments, condensed azo pigments, and chelate azo pigments. Polycyclic pigments include phthalocyanine pigments, perylene pigments, perinone pigments, anthraquinone pigments, and quinophthalone pigments.

The pigment used in the black ink used herein may be a carbon black. Examples of the carbon black include, but are not limited to, C.I. Pigment Black 7, such as furnace black, lampblack, acetylene black, and channel black; and commercially available carbon blacks, such as No. 2300, 900, MCF88, No. 20B, No. 33, No. 40, No. 45, No. 52, MA7, MA8, MA77, MA100, and No. 2200B (each produced by Mitsubishi Chemical); Color Blacks FW1, FW2, FW2V, FW18, FW200, 5150, 5160, and 5170, Printex 35, Printex U, Printex V, Printex 140U, and Special Blacks 6, 5, 4A, 4, and 250 (each produced by Degussa); and Conductex SC, Raven 1255, Raven 5750, Raven 5250, Raven 5000, Raven 3500, and Raven 700 (each produced by Carbon Columbia); and Regal 400R, Regal 330R, Regal 660R, Mogul L, Monarch 700, Monarch 800, Monarch 880, Monarch 900, Monarch 1000, Monarch 1100, Monarch 1300, Monarch 1400, and Elftex 12 (each produced by Cabot).

The pigment used in the white ink includes, but are not limited to, C.I. Pigment Whites 6, 18, and 21 and other inorganic white pigments, such as, titanium oxide, zinc oxide, zinc sulfide, antimony oxide, magnesium oxide, and zirconium oxide. Also, organic white pigments, apart from such inorganic white pigments, such as white hollow resin particles and polymer particles, may be used.

Pigments that can be used in the yellow ink include, but are not limited to, C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Pigments that can be used in a magenta ink include, but are not limited to, C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violets 19, 23, 32, 33, 36, 38, 43, and 50.

Pigments that can be used in a cyan ink include, but are not limited to, C.I. Pigment Blues 1, 2, 3, 15, 15:1, 15:2, 15:3, 15:34, 15:4, 16, 18, 22, 25, 60, 65, and 66; and C.I. Vat Blues 4 and 60.

Pigments that can be used for color inks other than magenta, cyan, and yellow include, but are not limited to, C.I. Pigment Greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

Examples of pearl pigments include, but are not limited to, pigments exhibiting pearly gloss or interference gloss, such as titanium dioxide-coated mica, fish scale foil, and bismuth trichloride.

Examples of metal pigments include, but are not limited to, elemental metals, such as aluminum, silver, gold, platinum, nickel, chromium, tin, zinc, indium, titanium, and copper, and alloys thereof.

The lower limit of the coloring material content in the color inks may be 0.5% by mass or more, for example, 1% by mass or more or 3% by mass or more, relative to the total mass of the ink composition. In addition, the upper limit of the coloring material content in the color inks may be 10% by mass or less, for example, 7% by mass or less or 6% by mass or less, relative to the total mass of the ink composition. When the coloring material content is in such a range, images formed on a printing medium are resistant to water, gases, light, and the like and, accordingly, can be stably stored.

When a combination of a pale ink composition and a deep ink composition that are of the same color type having different color densities is used, the coloring material content in the deep ink composition may be higher than that in the pale ink composition by 1% by mass or more, for example, 2% by mass or more or 3% by mass or more. When the deep ink composition and the pale ink composition have such a difference in coloring material content, high-quality images with favorable gradation can be printed.

In such a combination, the coloring material content in the pale ink composition may be 1.5% by mass or less relative to the total mass of the ink composition and, for example, may be 1% by mass or less, 0.8% by mass or less, 0.6% by mass or less, or 0.5% by mass or less. The lower limit in this case may be, but is not limited to, 0.05% by mass or more, 0.1% by mass or more, or 0.3% by mass or more.

In this instance, the lower limit of the coloring material content in the deep ink composition may be more than 1.5% by mass, for example, 2.0% by mass or more or 3.0% by mass or more, relative to the total mass of the ink composition. Also, the upper limit of this content may be 10% by mass or less, for example, 7% by mass or less or 6% by mass or less, relative to the total mass of the ink composition.

When a pigment is used as the coloring material, the pigment may be in the form of a dispersion liquid. The pigment dispersion liquid contains a pigment and a solvent and optionally a dispersant. The solvent may be water or a hydrophilic solvent, such as diethylene glycol. The dispersant may be a styrene-acrylic acid copolymer. The acid value of the dispersant may be, but is not limited to, 20 mg KOH/g or more from the viewpoint of uniformly dispersing the pigment.

In an embodiment, a clear ink may be used as one of the inks. The coloring material content in the clear ink may be 0.2% by mass or less, for example, 0.1% by mass or less or 0.05% by mass or less, and the lower limit thereof may be 0% by mass. The clear ink is not intended to color the printing medium and is used for other purposes. For example, the clear ink may be used, but is not limited to, to increase the rub fastness and other properties of the printed item, to adjust the gloss of the printing medium, to fix color inks, or to improve color development. In addition, the clear ink is not the treatment liquid described later herein and, therefore, contains no flocculant.

1.3.3. Organic Solvent

In some embodiments, the inks may contain an organic solvent. The organic solvent facilitates stable ejection of ink and helps dry the ink ejected onto the printing medium. Thus, inks containing an organic solvent can form high-quality images having a high rub fastness.

The organic solvent used in the inks may be soluble in water. Inks containing a water-soluble organic solvent can be readily dried and, thus, can form high-quality images having a high rub fastness.

Examples of the water-soluble organic solvent include, but are not limited to, alkanediols, polyols, nitrogen-containing solvents, esters, glycol ethers, and cyclic esters.

Exemplary alkanediols include 1,2-alkanediols, such as ethylene glycol, propylene glycol, 1,2-propanediol, 1,2-butanediol, 1,2-pentanediol, 1,2-hexanediol, and 1,2-octanediol, 1,3-propanediol, and 1,4-butanediol, 1,6-hexanediol. Such alkanediols may be used individually or in combination. Alkanediols are beneficial for increasing the wettability of the ink composition on the printing medium and helping the ink composition to penetrate the printing medium. In particular, 1,2-alkanediols are beneficial for helping penetration and may be often used as the solvent. The alkanediol used in the inks may be a diol of an alkane having a carbon number of 5 or more. The alkane may be linear or branched, and the carbon number thereof may be from 5 to 9.

Exemplary polyols include diethylene glycol, triethylene glycol, dipropylene glycol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerin. Such polyols may be used individually or in combination. Polyols are beneficial as moisturizer. The polyol used in the inks may be a compound formed by binding two or more hydroxy groups to an alkane having a carbon number of 4 or less, or a compound formed by 2 to 4 intermolecular condensations of some of the hydroxy groups of compounds formed by binding two or more hydroxy groups to an alkane having a carbon number of 4 or less. Polyols are compound having two or more hydroxy groups in the molecule thereof. In some embodiments according to the present disclosure, the number of hydroxy groups may be 2 or 3.

Exemplary nitrogen-containing solvents include pyrrolidones, such as N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. Such compounds may be used individually or in combination. Nitrogen-containing solvents, which act as a dissolving agent favorable to resin components, help the ink composition to produce printed items having high fastness to rubbing and prevent the ink composition from clogging the nozzles of the ink jet head.

The nitrogen-containing solvent may be an alkoxyalkylamide, and examples thereof include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

In an embodiment, an amide-based solvent may be used as the nitrogen-containing solvent. The amide-based solvent may be a cyclic amide-based solvent or an acyclic amide-based solvent. The cyclic amide-based solvent may be any one of the above-cited pyrrolidines. The acyclic amide-based solvent may be any one of the above-cited alkoxyalkylamides.

The content of the nitrogen-containing solvent in the ink compositions may be from 3% by mass to 30% by mass, for example, from 5% by mass to 25% by mass or from 10% by mass to 20% by mass. The ink containing a nitrogen-containing solvent is beneficial for improving rub fastness, image quality, and the like.

Exemplary esters include glycol monoacetates, such as ethylene glycol monoethyl ether acetate, ethylene glycol monomethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate; and glycol diesters, such as ethylene glycol diacetate, diethylene glycol diacetate, propylene glycol diacetate, dipropylene glycol diacetate, ethylene glycol acetate propionate, ethylene glycol acetate butylate, diethylene glycol acetate butylate, diethylene glycol acetate propionate, diethylene glycol acetate butylate, propylene glycol acetate propionate, propylene glycol acetate butylate, dipropylene glycol acetate butylate, and dipropylene glycol acetate propionate.

Exemplary glycol ethers include alkylene glycol monoethers and alkylene glycol diethers. In some embodiments, an alkyl ether may be used. Examples of such an glycol ether include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monopropyl ether, dipropylene glycol monobutyl ether, and tripropylene glycol monobutyl ether; and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, tetraethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether. Glycol ethers are beneficial for controlling the wettability of the ink composition on the printing medium.

In some embodiments, alkylene glycol dieters may be more beneficial than alkylene glycol mono ethers. Alkylene glycol diethers are more likely to dissolve the resin in the ink or cause the resin to become distended, thus increasing the rub fastness of the resulting image.

Exemplary cyclic esters include lactones, such as β-propiolactone, γ-butyrolactone, δ-valerolactone, ε-caprolactone, β-butyrolactone, β-valerolactone, ε-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nanolactone, ε-nanolactone, and ε-decanolactone; and compounds derived from these lactones by substituting an alkyl group having a carbon number of 1 to 4 for the hydrogen of the methylene group adjacent to the carbonyl group of the lactone.

The organic solvent content may be 1% by mass or more, for example, 5% by mass or more or 10% by mass or more, relative to the total mass of the ink composition. Also, the organic solvent content may be 40% by mass or less, for example, 35% by mass or less or 30% by mass or less, relative to the total mass of the ink composition. Ink compositions containing an organic solvent with such a content are unlikely to cause clogging and help produce printed items having a high rub fastness.

The normal boiling point of the organic solvent may be 180° C. or more, for example, 200° C. or more or 210° C. or more. Also, the normal boiling point of the organic solvent may be 300° C. or less, for example, 270° C. or less or 250° C. or less. Ink compositions containing an organic solvent having such a normal boiling point are unlikely to cause clogging and help produce printed items having a high rub fastness.

Polyols having a normal boiling point of 280° C. or more, such as triethylene glycol and glycerin, act as a moisturizing agent, and accordingly, the ink composition containing such a polyol is beneficial for reducing drying of the ink jet head and thus helps stable ejection. However, polyols having a normal boiling point of 280° C. or more may absorb water in the ink composition, thus increasing the viscosity of the ink composition around the ink jet head, or the ink may be made difficult to dry when applied onto the printing medium. Accordingly, the upper limit of the polyol content having a normal boiling point of 280° C. or more in the ink compositions is beneficially 3% by mass or less, for example, 2% by mass or less or 1% by mass or less. In some embodiments, it may be 0.8% by mass or less or 0.1% by mass or less. Such an ink composition can dry rapidly on the printing medium and is accordingly suitable to print images on poorly absorbent printing media or non-absorbent printing media, and the resulting printed images exhibit a high rub fastness.

In view of this, in addition, it is beneficial to control the content of the organic solvent having a normal boiling point of 280° C. or more to the foregoing range. The organic solvent having a normal boiling point of 280° C. or more is not limited to polyols.

1.3.4. Resin

In some embodiments, the inks may contain a resin. The resin solidifies the ink and firmly fixes the solidified ink to the printing medium. The resin may be dissolved or dispersed in the ink composition. For dissolving the resin, the above described resin dispersant used for dispersing the pigment in the ink may be used. The resin in the form of dispersion may be an emulsion or a suspension. The emulsion or the suspension may be prepared by dispersing fine particles of a resin that is insoluble or poorly soluble in the liquid medium of the ink.

Examples of the resin used in the inks disclosed herein include, but are not limited to, acrylic resin, vinyl acetate resin, polyvinyl chloride resin, butadiene resin, styrene resin, polyester resin, crosslinked acrylic resin, crosslinked styrene resin, benzoguanamine resin, phenol resin, silicone resin, epoxy resin, urethane resin, paraffin resin, fluororesin, and water-soluble resin, and copolymers of monomers forming these resins. Examples of the copolymers include, but are not limited to, styrene-butadiene resin and styrene-acrylic resin. A polymer latex containing one or more of these resins may be used as the resin. For example, a polymer latex containing fine particles of a resin, such as acrylic resin, styrene-acrylic resin, styrene resin, crosslinked acrylic resin, or crosslinked styrene resin, may be used. The resins cited above may be used individually or in combination.

Acrylic resin is a homopolymer or a copolymer formed by polymerizing one or more acrylic monomers. Acrylic monomers include (meth)acrylates, (meth)acrylic acid, acrylamide, and acrylonitrile. The acrylic resin in a copolymer form may be an acrylic-vinyl resin that is formed by using a vinyl monomer as the other monomer, for example, a styrene-acrylic resin formed by using styrene as the vinyl monomer. Acrylic resin, urethane resin, and polyester resin are more available than other resins and beneficial for obtaining a resin having desired properties.

The lower limit of the resin solid content may be 1% by mass or more, for example, 2% by mass or more or 3% by mass or more, relative to the total mass of the ink composition. The upper limit of the resin solid content may be 15% by mass or less, for example, 10% by mass or less or 7% by mass or less, relative to the total mass of the ink composition. The ink composition containing a resin with such a content is unlikely to cause clogging and can form images having a high rub fastness even on a poorly ink-absorbent or non-ink-absorbent printing medium.

1.3.5. Surfactant

In some embodiments, the inks may contain a surfactant. Examples of the surfactant include, but are not limited to, acetylene glycol-based surfactants, fluorosurfactants, and silicone surfactants. The inks may contain at least one of these surfactants, particularly, a silicone surfactant. The silicone surfactant in an ink reduces the dynamic surface tension of the ink and makes the ink unlikely to cause clogging.

Exemplary acetylene glycol-based surfactants include, but are not limited to, SURFYNOL series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (each produced by Air Products and Chemicals); OLFINE series B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (each produced by Nissin Chemical Industry); and ACETYLENOL series E00, E00P, E40, and E100 (each produced by Kawaken Fine Chemicals).

The silicone surfactant may be, but is not limited to, a polysiloxane-based compound. For example, a polyether-modified organosiloxane may be used as the polysiloxane-based compound. Polyether-modified organosiloxanes are commercially available, and examples thereof include BYK-306, BYK-307, BYK-333, BYK-341, BYK-345, BYK-346, and BYK-348 (each produced by BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (each produced by Shin-Etsu Chemical).

The fluorosurfactant used in the inks may be a fluorine-modified polymer, such as BYK-340 (produced by BYK).

When the inks contain a surfactant, the content thereof may be from 0.1% by mass to 1.5% by mass or from 0.5% by mass to 1% by mass relative to the total mass of the ink composition.

1.3.6. Wax

In an embodiment, the inks may contain a wax. The wax may be dissolved in the ink composition or be in the form of emulsion in which fine particles thereof are dispersed. The use of such a wax tends to be helpful to increase the rub fastness of the printed item. In particular, the wax tends to be locally present at the surface of the coating of the ink, that is, at the interface between the air and the coating, on the printing medium, thus contributing to increasing the rub fastness. The wax may be, but is not limited to, an ester wax made up of a higher fatty acid and a higher monohydric or dihydric alcohol, a paraffin wax, a microcrystalline wax, an olefin wax, or a mixture thereof.

The polyolefin wax may be a wax or a copolymer of the wax produced from an olefin, such as ethylene, propylene, or butylene, or an olefin derivative, and examples of the polyolefin wax include polyethylene waxes, polypropylene waxes, and polybutylene waxes. A commercially available polyolefin wax may be used, and examples thereof include NOPCOTE PEM 17 (produced by San Nopco), CHEMIPEARL W4005 (produced by Mitsui Chemicals), and AQUACER 515 and AQUACER 593 (each produced by BYK).

The wax content in the ink composition may be from 0.1% by mass to 5% by mass, for example, from 0.2% by mass to 4% by mass or 0.3% by mass to 3% by mass, relative to the total mass of the ink composition. When the wax content is in such a range, the use of such an ink composition improves the rub fastness of the printed images, and the ink composition has a low viscosity and, accordingly, can be stably ejected and helps nozzles recover from clogging.

1.3.7. Antifoaming Agent

Examples of the antifoaming agent include, but are not limited to, silicone antifoaming agents, polyether antifoaming agents, fatty acid ester antifoaming agents, and acetylene glycol antifoaming agents. The antifoaming agent is commercially available, and examples thereof include, but are not limited to, BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, and BYK-1770 (each produced by BYK); and Surfynol series DF37, DF110D, DF58, DF75, DF220, and MD-20 and Enviro Gem AD01 (each produced by Air Products and Chemicals). Such antifoaming agents may be used individually or in combination.

The antifoaming agent content may be from 0.03% by mass to 0.7% by mass, for example, from 0.05% by mass to 0.5% by mass or from 0.08% by mass to 0.3% by mass, relative to the total mass of the ink composition.

1.3.8. Other Constituents

The ink compositions disclosure herein may optionally contain a solubilizing agent, a viscosity modifier, a pH adjuster, an antioxidant, a preservative, an antifungal agent, a moisturizing agent that does not act as an organic solvent, and a chelating agent for capturing metal ions affecting dispersion, and other additives, from the viewpoint of maintaining the stability in ejection from the ink jet head, suppressing clogging, and preventing deterioration.

1.3.9. Preparation of Ink Compositions

The ink compositions disclosed herein are prepared by mixing the above-described constituents in a desired order and, optionally, removing impurities by, for example, filtration. For mixing the constituents, for example, the constituents may be added one after another into a container equipped with a stirring device, such as a mechanical stirrer or a magnetic stirrer, and the contents of the container are stirred. Filtration may be performed as required by, for example, centrifugal filtration or using a filter paper.

1.3.10. Physical Properties of Ink Compositions

In the embodiment shown in FIG. 3, the ink fed to the ink nozzles 15a arranged closest to the treatment liquid nozzles 16 in the scanning direction has a viscosity that will increase by a factor of 6.0 or less with respect to the initial viscosity when mixed with a solution of 5% by mass of calcium acetate in water in a ratio of 2:1. When the ink nozzles 15a are filled with an ink having such a viscosity, the ink nozzles 15a suppress mixing the treatment liquid with the inks even if the mist of the treatment liquid is scattered in the scanning direction, thus preventing nozzles from being clogged.

The viscosity of the inks may be measured at a shear rate of 200 $s^{-1}$ with, for example, a rheometer MCR-300 manufactured by Anton Paar, and the factor of viscosity increase of ink may be calculated as a ratio of the viscosity when the ink is mixed with the calcium acetate aqueous solution relative to the initial viscosity (mPa·s). When the ink and the calcium acetate aqueous, or treatment liquid, are mixed, the mixture is stirred so as to be a uniform mixture, for example, with a stirrer for 1 minute. The temperature in viscosity measurement will be described later herein.

In some embodiments, when the ink fed to the ink nozzles 15a is mixed with a solution of 5% by mass of calcium acetate in water in a ratio of 2:1, the viscosity of the ink may increase by a factor of 3.5 or less, for example, 3.3 or less, 2.7 or less, or 2.4 or less relative to the viscosity before being mixed.

In the embodiment shown in FIG. 3, the ink fed to the at least one group of the ink nozzles other than the ink nozzles 15a may have a viscosity that will increase by a factor of more than 6.0 relative to the initial viscosity when mixed with a solution of 5% by mass of calcium acetate in water in a ratio of 2:1. For example, this ink is fed to the ink nozzles 15b that is closest to the ink nozzles 15a in the scanning direction. In this instance, since the ink nozzles 15a is located between the ink nozzles 15b and the treatment liquid nozzles 16, the ink nozzles 15b are not clogged even if the mist of the treatment liquid is scattered in the scanning direction.

As just described, in the arrangement in which the ink nozzles 15a filled with an ink poorly reactive with the treatment liquid are located close to the treatment liquid nozzles 16, while the ink nozzles 15b filled with an ink more reactive than the ink of the ink nozzles 15a with the treatment liquid are located far from the treatment liquid nozzles 16, clogging of the nozzles is reduced.

Beneficially, the inks used in the present disclosure have a surface tension from 18 mN/m to 40 mN/m at 25° C., for example, from 20 mN/m to 35 mN/m or from 22 mN/m to 33 mN/m, from the viewpoint of the balance between the quality of images and the reliability of the inks as an ink jet ink. The surface tension of an ink may be determined by measuring the ink wetting a platinum plate at 25° C. with, for example, an automatic surface tensiometer CBVP-Z (manufactured by Kyowa Interface Science).

Also, from the same viewpoint as above, the viscosity of the inks used herein may be from 3 mPa·s to 10 mPa·s at 25° C., for example, from 3 mPa·s to 8 mPa·s. The viscosity may be measured at 25° C. with a rheometer MCR-300 (manufactured by Anton Paar).

1.4. Treatment Liquid

The treatment liquid used in the embodiments according to the present disclosure will now be described.

The treatment liquid used herein is a composition used to flocculate one or more constituents of the inks and may contain a flocculant. The treatment liquid reacts with the coloring material, the resin, or the like contained in the ink. The coloring material content in the treatment liquid may be 0.2% by mass or less, 0.1% by mass or less, or 0.05% by mass or less. The lower limit of the coloring material content is 0% by mass. Unlike the above-described color ink, the treatment liquid is not a color ink used to color the printing medium and is an aid that is applied onto the printing medium before or simultaneously with applying color ink. In addition, the treatment liquid is not a clear ink mentioned above.

The treatment liquid may contain other constituents with a desired content and have any properties, independent of the ink compositions, provided that it contains a flocculant. The treatment liquid is beneficial for printing high-quality images. However, the use of the treatment liquid may lead to a reduced rub fastness or make clogging more likely to occur.

1.4.1. Flocculant

The treatment liquid used herein may contain a flocculant that flocculates one or more constituents of the ink compositions. The flocculant in the treatment liquid reacts rapidly with the coloring material and/or the resin in the ink composition in the step of applying ink described later herein. Thus, the coloring material and the resin dispersed in the ink composition are flocculated. The flocculate inhibits the coloring material from penetrating the printing medium, thus improving the quality of printed images.

The flocculant may be a multivalent metal salt, a cationic compound, such as a cationic resin or a cationic surfactant, or an organic acid. Such a flocculant may be used individually, or some flocculants may be used in combination. In some embodiments, the flocculant may be at least one selected from the group consisting of multivalent metal salts, organic acids, and cationic resins because such compounds are highly reactive with the resin contained in the ink compositions.

The multivalent metal salt may be a water-soluble compound composed of a divalent or higher-valent metal ion and an anion capable of binding to the metal ion. Examples of the multivalent metal ion include divalent metal ions, such as $Ca^{2+}$, $Cu^{2+}$, $Ni^{2+}$, $Mg^{2+}$, $Zn^{2+}$, and $Ba^{2+}$; and trivalent metal ions, such as $Al^{3+}$, $Fe^{3+}$, and $Cr^{3+}$. Examples of the anion include $Cl^-$, $I^-$, $Br^-$, $SO_4^{2-}$, $ClO_3^-$, $NO_3^-$, $HCOO^-$, and $CH_3COO^-$. Calcium salts and magnesium salts are beneficial in terms of stability of the treatment liquid and reactivity of the treatment liquid as the flocculant.

Examples of the organic acid include phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furancarboxylic acid, pyridinecarboxylic acid, coumaric acid, thiophenecarboxylic acid, nicotinic acid, and derivatives or salts of these acids. Such organic acids may be used individually or in combination. Organic acid salts of multivalent metals belong to the category of the above-described multivalent metal salts.

Examples of the cationic resin include cationic urethane resin, cationic olefin resin, and cationic amine-based resin. The cationic amine-based resin has an amino group, and examples thereof include allylamine resin, polyamine resin, quaternary ammonium salt polymer, and polyamine resin. The polyamine resin may be a resin having an amino group in the main skeleton of the resin. The allylamine resin may be a resin having a structure derived from the allyl group in the main skeleton of the resin. The quaternary ammonium salt polymer may be a resin having a quaternary ammonium salt in the structure thereof. The polyamide resin may be a resin having an amide group in the main skeleton of the resin and an amino group in a breached chain of the resin. Cationic amine-based resin is superior in reactivity and availability to other cationic resins and is therefore often used.

The flocculant content in the treatment liquid may be 0.5% by mass or more, for example, 1% by mass or more or 3% by mass or more, relative to the total mass of the treatment liquid. Also, the flocculant content in the treatment liquid may be 15% by mass or less, for example, 10% by mass or less or 5% by mass or less, relative to the total mass of the treatment liquid.

1.4.2. Water

In some embodiments, the treatment liquid may be an aqueous composition containing water as a major solvent. The water will be evaporated by drying after the treatment liquid has been applied onto the printing medium. The water may be pure water or ultra-pure water from which ionic impurities have been removed as much as possible. Examples of such water include ion exchanged water, ultrafiltered water, reverse osmosis water, and distilled water. Sterile water prepared by, for example, UV irradiation or addition of hydrogen peroxide is beneficial. The use of sterile water can prevent, for a long period, the occurrence of mold or bacteria in the treatment liquid. The water content in the treatment liquid may be 40% by mass or more relative to the total mass of the treatment liquid and is, for example, 50% by mass or more, 60% by mass or more, or 70% by mass or more. The upper limit of the water content may be, but is not limited to, for example, 99% by mass or less.

1.4.3. Organic Solvent

The treatment liquid may contain an organic solvent. By adding an organic solvent, the wettability of the treatment liquid on the printing medium can be increased. The organic solvent may be selected from the organic solvents cited as those used in the ink compositions. The organic solvent content may be, but is not limited to, from 10% by mass to 80% by mass, for example, from 15% by mass to 70% by mass, relative to the total mass of the treatment liquid.

The normal boiling point of the organic solvent used in the treatment liquid may be in the range described for the organic solvent that can be used in the ink compositions, and the organic solvent may be selected independently of the organic solvent used in the ink compositions. Alternatively, the normal boiling point of the organic solvent used in the treatment liquid may be 180° C. or more, for example, 190° C. or more or 200° C. or more. Also, the normal boiling point of the organic solvent may be 300° C. or less, for example, 270° C. or less or 250° C. or less.

As with the ink compositions, the treatment liquid may contain a water-soluble organic solvent having a normal boiling point of 280° C. or more with a content of 5% by mass or less or 3% by mass or less, for example, 2% by mass or less or 1% by mass or less. In some embodiments, the content of such an organic solvent may be 0.8% by mass or less or 0.1% by mass or less. Such a treatment liquid can dry easily and rapidly. Accordingly, the resulting printed article is unlikely to be sticky and superior in rub fastness.

1.4.4. Surfactant

The treatment liquid may contain a surfactant. By adding a surfactant, the surface tension of the treatment liquid can be reduced, and accordingly, the wettability of the treatment liquid on the printing medium can be increased. In some embodiments, an acetylene glycol-based surfactant, a silicone surfactant, or a fluorosurfactant may be selected from among the surfactants. Examples of the surfactant that may be used in the treatment liquid are the same as those cited for the ink composition. The surfactant content may be, but is not limited to, 0.1% by mass to 5% by mass relative to the total mass of the treatment liquid.

1.4.5. Other Constituents

The treatment liquid used herein may optionally contain a pH adjuster, a preservative or a fungicide, a rust preventive, a chelating agent, and other additives as described above.

1.4.6. Preparation of Treatment Liquid

The treatment liquid used herein may be prepared by mixing and dispersing the above-described ingredients in an appropriate manner. After stirring the mixture, foreign matter and coarse particles that may cause clogging are removed through a filter to yield a desired treatment liquid.

1.4.7. Physical Properties of Treatment Liquid

When the treatment liquid is applied by being ejected from an ink jet head, the surface tension of the treatment liquid at 25° C. is beneficially from 18 mN/m to 40 mN/m, from 20 mN/m to 35 mN/m, or from 22 mN/m to 33 mN/m. The surface tension may be determined by measuring the treatment liquid wetting a platinum plate at 25° C. with, for example, an automatic surface tensiometer CBVP-Z (product name, manufactured by Kyowa Interface Science).

In addition, from the same viewpoint as just mentioned, the viscosity of the treatment liquid at 25° C. may be from 3 mPa·s to 10 mPa·s or from 3 mPa·s to 8 mPa·s. The viscosity may be measured at 25° C. with a rheometer MCR-300 (manufactured by Anton Paar).

1.5. Printing Medium

The ink jet printing apparatus disclosed herein can print high-quality images having a high rub fastness on poorly ink-absorbent or non-ink-absorbent printing media. In particular, combined use of the inks and the treatment liquid enables high-quality images having a high rub fastness to be printed on non-ink-absorbent or poorly ink-absorbent printing media.

Examples of ink-absorbent printing media include cloths of ink absorbent material, such as cotton, silk, polyester, polyurethane, and nylon, plain paper, ink jet paper, moderately absorbent fine quality paper, recycled plain paper, copy paper, and ink jet paper including an ink-receiving layer capable of absorbing ink.

The poorly ink-absorbent printing medium may be provided with a coating layer capable of receiving ink on the surface thereof. The base material of such a poorly ink-absorbent printing medium may be paper or a plastic film made of polyvinyl chloride, polyethylene terephthalate, polycarbonate, polystyrene, polyurethane, polyethylene, polypropylene, or the like. Examples of the paper-base printing medium may be a book-printing paper, such as art paper, coated paper, or matte paper. The plastic film-base printing medium is coated with a hydrophilic polymer or silica or titanium particles applied together with a binder.

The non-ink-absorbent printing medium may be a plastic film not surface-treated for ink jet printing (not having an ink-absorbing layer), or a paper sheet or any other medium coated or bonded with a plastic film. The term plastic mentioned here may be polyvinyl chloride, polyethylene terephthalate, polycarbonate, polystyrene, polyurethane, polyethylene, or polypropylene.

The poorly ink-absorbent or non-ink-absorbent printing media used herein refer to printing media that can absorb water in an amount of 10 mL/m$^2$ or less for a period of 30 ms$^{1/2}$ from the beginning of contact with water, measured by Bristow's method. Bristow's method is broadly used for measuring liquid absorption in a short time, and Japan Technical Association of the Pulp and Paper Industry (JAPAN TAPPI) officially adopts this method. Details of this method are specified in Standard No. 51 (Paper and Paperboard-Liquid Absorption Test Method-Bristow's Method (in Japanese)) of JAPAN TAPPI Paper and Pulp Test Methods edited in 2000 (in Japanese).

The printing medium may be translucent or transparent. Also, poorly ink-absorbent or non-ink-absorbent media having an uneven surface, such as embossed media may be used.

2. INK JET PRINTING METHOD

The ink jet printing method according to the present disclosure is a serial printing method using the above-described ink jet printing apparatus including an ink jet head. In this method, printing is performed by alternately repeating scanning in a scanning direction and sub-scanning in a sub-scanning direction. The term scanning used herein refers to the operation of ejecting an ink onto a printing medium from the ink jet head sweeping across the printing medium, and the term sub-scanning used herein refers to the operation of transporting the printing medium in the sub-scanning direction.

In the serial printing method, the number of times of scanning refers to the number of passes of the nozzles filled with a composition over a position to be printed of a printing medium in a manner opposing the printing medium. The number of times of scanning is set for each composition. For example, when a group of the nozzles shown in FIG. 3 is used for printing and the distance of one sub-scan is a half of the length of the nozzle group in the sub-scanning direction, the number of times of scanning using this nozzle group is two. The number of times of scanning can be increased by reducing the distance of one sub-scan in the sub-scanning direction and can be reduced by increasing the distance. When the number of times of scanning is large, a large amount of composition can be applied in total, and a certain amount of a composition can be applied by a plurality of times of scanning. In contrast, when the number of times of scanning is small, the printing speed is increased. The number of times of scanning may be referred to as the number of passes.

In the ink jet printing method disclosed herein, the maximum distance of one scan (one time of scanning) may be 50 cm or more. The "maximum distance of one scan" mentioned herein is the distance of the movement of a point of the ink jet head opposing the printing medium when printing is performed across the printing medium from one end in the scanning direction to the other in one scan. The maximum distance of one scan may be from 50 cm to 500 cm, from 50 cm to 400 cm, from 55 cm to 300 cm, or from 60 cm to 200 cm. In some embodiments, it may be from 70 cm to 190 cm, from 100 cm to 180 cm, or from 130 cm to 170 cm. When the maximum distance of one scan is 50 cm or more, display-intended printed items can be favorably produced. The upper limit of the maximum distance may be, but is not limited to, 500 cm or less in view of the structure of the printing apparatus. When an image is printed, scanning may be performed a shorter distance than the maximum distance of one scan according to the image.

Beneficially, the width of the printing medium, that is, the distance of the printing medium in the scanning direction, is in the above-described range of the maximum distance. In this instance, the maximum distance of one scan can be in the above-described range.

The ink jet printing method disclosed herein includes a treatment liquid application step performed by scanning and an ink application step and optionally a secondary heating step.

2.1. Treatment Liquid Application Step

In the treatment liquid application step, the treatment liquid capable of reacting with the ink compositions is applied onto a printing medium. By applying the treatment liquid onto the printing medium, the rub fastness and the image quality of the printed image can be improved.

The treatment liquid may be applied before or simultaneously with applying the ink compositions. In the embodiment using the nozzle arrangement shown in FIG. 3, the treatment liquid application step is performed simultaneously with the ink application step described later herein. In the embodiment using the nozzle arrangement shown in FIG. 4, a part of the treatment liquid application step is performed before the ink application step, and the rest of the treatment liquid application step is performed simultaneously with the ink application step.

When the treatment liquid and the ink compositions are applied onto a printing region of the printing medium 10, the printing region may include an area where the treatment liquid is applied in a proportion from 20% by mass to 50% by mass relative to the mass of the applied ink compositions. Beneficially, the proportion of the applied treatment liquid to the applied ink compositions may be 25% by mass to 40% by mass, or 28% by mass to 35% by mass. When the proportion or percentage of the applied treatment liquid to the applied ink composition is in such a range, more high-quality images can be formed, and the rub fastness of the resulting images can be prevented from decreasing. In the embodiment using the nozzle arrangement shown in FIG. 4, since a part of the treatment liquid is applied before the application of the ink compositions, high image quality can be provided even if the proportion of the applied treatment liquid to the applied ink compositions is 10% by mass or less. In the printing region where the ink compositions and the treatment liquid are applied, the area onto which the largest amount of ink is applied may receive the treatment liquid and the ink composition in a proportion in any of the above ranges.

The printing medium 10 may be heated before the treatment liquid application step with the preheater 7 shown in FIG. 1 or during the treatment liquid application step with the IR heater 3 or the platen heater 4 shown in FIG. 1. The treatment liquid applied onto the heated printing medium 10 becomes likely to spread on the printing medium 10, thus being uniformly applied. Consequently, the treatment liquid can react sufficiently with the inks applied in the ink application step described later herein to provide favorable image quality. In addition, since the treatment liquid thus can be uniformly applied onto the printing medium 10, the amount of treatment liquid to be applied is reduced, and the rub fastness of the resulting image is prevented from decreasing.

The surface temperature of the printing medium 10 when the treatment liquid is applied thereto may be set independent of the range of the surface temperature (primary heating temperature) of the printing medium 10 when inks are applied thereto. The surface temperature of the printing medium 10 when the treatment liquid is applied thereto may be 45° C. or less, for example, 40° C. or less or 38° C. or less. The lower limit of the surface temperature of the printing medium 10 when the treatment liquid is applied thereto may be 25° C. or more, for example, 30° C. or more. When the surface temperature of the printing medium 10 is in such a range, the treatment liquid can be uniformly applied onto the printing medium 10 to increase the rub fastness and image quality of the printed image. In addition, the impact of heat on the ink jet head 2 is reduced.

2.2. Ink Application Step

In the ink application step, the above-described inks are ejected from the ink jet head 2 to be applied onto the printing medium 10, thus forming an image on the surface of the printing medium 10.

The maximum rate of application amount of the ink compositions onto the printing medium 10 may be 5 mg/inch$^2$ or more, for example, 7 mg/inch$^2$ or more or 10 mg/inch$^2$ or more. The upper limit of the application amount of the ink compositions may be, but is not limited to, 30 mg/inch$^2$ or less or 25 mg/inch$^2$ or less, for example, 20 mg/inch$^2$ or less or 18 mg/inch$^2$ or less. In some embodiments, it may be 16 mg/inch$^2$ or less. The maximum rate of application amount of the ink compositions is the total mass of the ink compositions superimposed per unit area.

The printing medium 10 may be heated with the IR heater 3 or the platen heater 4 before the ink application step or simultaneously with the ink application step, and it is beneficial to apply the ink compositions onto the printing medium 10 heated by such heating. By heating the printing medium 10, the inks are rapidly heated on the printing medium, so that bleeding can be reduced. In addition, the resulting image exhibits a high rub fastness and high image quality.

The upper limit of the nozzle face temperature when the printing medium 10 is heated, that is, the maximum temperature of the nozzle face during printing, may be 55° C. or less or 50° C. or less, for example, 45° C. or less or 40° C. or less. By controlling the nozzle face temperature in such a range when ink is applied, the impact of heat on the ink jet head 2 is reduced to prevent the ink jet head 2 and nozzles from being clogged. Also, the lower limit of the nozzle face temperature during ink jet printing may be higher than room temperature and may be 28° C. or more, for example, 30° C. or more or 32° C. or more. By controlling the nozzle face temperature in such a range during ink jet printing, the inks on the printing medium 10 can be rapidly dried and solidified, thus reducing bleeding to yield images exhibiting high rub fastness and high image quality. The nozzle face temperature when the inks are applied onto the printing medium 10 may be increased by the heat at the surface of the printing medium or the heat generated from the ink jet head 2.

The maximum period for one scan in the ink application step may be 0.8 s and may be, for example, from 0.8 s to 5 s, from 1.0 s to 4 s, or from 1.2 s to 2.5 s. In some embodiments, it may be from 1.5 s to 2.0 s. The maximum period for one scan in such a range is suitable for printing on a printing medium with a width in the above-described range.

The "maximum period for one scan" mentioned herein is the period of time for which a point of the ink jet head opposing the printing medium moves when printing is performed across the printing medium from one end in the scanning direction to the other in one scan. When an image is printed, scanning may be performed a shorter period than the maximum period for one scan according to the image. The average scanning speed in the ink application step may be from 60 cm/s to 100 cm/s.

2.3. Secondary Heating

The ink jet printing method disclosed herein may optionally include a secondary heating step (may be referred to as post-heating step) of heating the printing medium 10 having the applied ink compositions on the surface thereof with the secondary heater 5 shown in FIG. 1. Thus, the resin in the ink compositions on the printing medium 10 is melted to form an ink coating film and solidified to be firmly fixed to the printing medium 10, thus forming a high-quality image having a high fastness in a short time.

The upper limit of the surface temperature of the printing medium 10 heated by the secondary heater 5 may be 120° C. or less, for example, 110° C. or less or 100° C. or less. Also, the lower limit of the surface temperature of the printing medium 10 at this time may be 60° C. or more, for example, 70° C. or more or 80° C. or more. By controlling the surface temperature in such a range, high-quality images having a high rub fastness can be formed in a short time while clogging is suppressed.

After the secondary heating step, the ink compositions on the printing medium 10 may be cooled with the cooling fan 6 shown in FIG. 1.

2.4. Other Steps

The printing method disclosed herein may include a cleaning step of discharging the ink compositions and the treatment liquid with a mechanism other than a pressure generator configured to eject inks for printing, that is, other than an ink ejection mechanism included in the ink jet head 2.

The ink ejection mechanism including in the ink jet head 2 may be a piezoelectric element or a heater element that is operable to apply a pressure to the ink and is disposed in a pressure generating chamber (not shown). The cleaning step may be performed by applying an external pressure to the ink jet head 2 to discharge the ink compositions and the treatment liquid from the nozzle. This cleaning step reduces the risk of the resin melting and adhering to the inner wall of the ink jet head 2, thus helping stable ejection.

The mechanism operable for cleaning may be a mechanism configured to apply a negative pressure, a mechanism configured to apply a positive pressure upstream of the ink jet head, or any other mechanism capable of applying a pressure. The discharge of the inks and the treatment liquid is not the discharge by the function of the ink jet head itself, that is, by flushing. Hence, the discharge is not the operation performed by using a function to eject ink from the ink jet head.

In the ink jet printing method disclosed herein, first ink nozzles filled with an ink less reactive with the treatment liquid and having a viscosity that increases by a small factor are disposed close to the treatment liquid nozzles, and ink nozzles filled with an ink having a viscosity that increases by a larger factor than the ink in the foregoing ink nozzles are disposed far from the treatment liquid nozzles, as described above. Thus, clogging of the ink nozzles is reduced.

In some embodiments of the present disclosure, printing may be performed by ejecting the treatment liquid from the coincident portion in the arrangement of the treatment liquid nozzles coincident in the sub-scanning direction with the first and the second ink nozzles and ejecting inks from the coincident portion in the arrangement of the first and the second ink nozzles coincident in the sub-scanning direction with the treatment liquid nozzles, thus scanning the printing medium in the scanning direction. In this instance, the treatment liquid is not likely to reach the second ink nozzles; hence, the second ink nozzles are not likely to be clogged.

In addition, it is beneficial for the first ink nozzles and the second ink nozzles to have coincident portions coincident with each other in the sub-scanning direction and to eject ink through the nozzles of each coincide portion. In this arrangement, the ink ejected through the first ink nozzles blocks the scattering of the mist of the treatment liquid. The treatment liquid is thus not more likely to reach the second ink nozzles.

Alternatively, the first ink nozzles and the second ink nozzles may have no coincident portion, and inks are each ejected through the corresponding ink nozzles. In this arrangement as well, the treatment liquid is not likely to reach the second ink nozzles.

3. EXAMPLES

The subject matter of the present disclosure will be further described in detail with reference to Examples and Comparative Examples, but it is not limited to the Examples.

3.1. Preparation of Treatment Liquid and Inks

Constituents for each of the treatment liquids and the inks were mixed with the proportions shown in Table 1 or Table 2 and stirred. The mixture was filtered through a membrane filter of 5 μm in pore size, and, thus, treatment liquids A to C and Inks 1 to 10 were prepared. Each pigment was dispersed in water with a styrene-acrylic resin as a dispersant, and the resulting pigment dispersion was used. The styrene-acrylic resin was added in a proportion of 30% by mass relative to the pigment. Each value in Tables 1 and 2 represents the content of the corresponding constituent on a percent-by-mass basis, and ion exchanged water was added so that the total of the composition came to 100% by mass. The values for the pigments and the resins shown in Table 2 are represented in terms of solids content.

TABLE 1

|  |  | Treatment liquid A | Treatment liquid B | Treatment liquid C |
|---|---|---|---|---|
| Organic solvent | Propylene glycol | 15 | 15 | 15 |
|  | 2-Pyrrolidone | 10 | 10 | 10 |
| Flocculant | Calcium acetate monohydrate | 5 |  |  |
|  | Acetic acid |  | 4 |  |
|  | Catiomaster PD-7 (Solids) |  |  | 4 |

TABLE 1-continued

|  |  | Treatment liquid A | Treatment liquid B | Treatment liquid C |
|---|---|---|---|---|
| Antifoaming agent | DF110D | 0.1 | 0.1 | 0.1 |
| Surfactant | BYK348 | 1 | 1 | 1 |
| Pure water | — | Balance | Balance | Balance |
| Total |  | 100 | 100 | 100 |

TABLE 2

|  |  | Ink 1 | Ink 2 | Ink 3 | Ink 4 | Ink 5 | Ink 6 | Ink 7 | Ink 8 | Ink 9 | Ink 10 |
|---|---|---|---|---|---|---|---|---|---|---|---|
| Organic solvent | Propylene glycol | 10 | 10 | 10 | 10 | 10 | 10 | 10 | 10 | 10 | 3 |
|  | 2-Pyrrolidone | 13 | 13 | 13 | 13 | 13 | 13 | 13 | 13 | 13 | 13 |
|  | glycerin |  |  |  |  |  |  |  |  |  | 5 |
| Pigment dispersion liquid | Black pigment | 3 |  |  |  | 1 |  |  |  |  |  |
|  | Cyan pigment |  | 3 |  |  |  | 1 |  |  |  | 3 |
|  | Magenta pigment |  |  | 3 |  |  |  | 1 |  |  |  |
|  | Yellow pigment |  |  |  | 3 |  |  |  |  |  |  |
|  | White pigment |  |  |  |  |  |  |  | 8 |  |  |
| Resin | JONCRYL 62J | 6 | 6 | 6 | 6 | 6 | 6 | 6 | 6 | 7 | 6 |
|  | AQUACER539 | 1 | 1 | 1 | 1 | 1 | 1 | 1 | 1 | 2 | 1 |
| Antifoaming agent | DF110D | 0.1 | 0.1 | 0.1 | 0.1 | 0.1 | 0.1 | 0.1 | 0.1 | 0.1 | 0.1 |
| Surfactant | BYK348 | 1 | 1 | 1 | 1 | 1 | 1 | 1 | 1 | 1 | 1 |
| Pure water | — | Balance | Balance | Balance | Balance | Balance | Balance | Balance | Balance | Balance | Balance |
| Total |  | 100 | 100 | 100 | 100 | 100 | 100 | 100 | 100 | 100 | 100 |
| Initial viscosity (mPa · s) |  | 4.9 | 4.9 | 4.9 | 4.9 | 4.9 | 4.9 | 4.9 | 4.9 | 4.9 | 5.2 |
| Viscosity after mixing with flocculant (mPa · s) |  | 23.0 | 17.9 | 32.3 | 26.7 | 11.6 | 11.2 | 13.5 | 16.1 | 5.2 | 19.2 |
| Factor of viscosity increase |  | 4.7 | 3.7 | 6.6 | 5.5 | 2.4 | 2.3 | 2.7 | 3.3 | 1.1 | 3.7 |

The constituents shown in Tables 1 and 2 are as follows:
Flocculant
  Catiomaster PD-7: amine-epichlorohydrin condensation polymer, produced by Yokkaichi Chemical
Antifoaming Agent:
  DF110D: SURFYNOL DF110D (product name), acetylenediol-based surfactant, produced by Nissin Chemical Industry Surfactant
  BYK 348: silicone surfactant produced by BYK
Pigment
  Black pigment: Carbon Black
  Cyan pigment: C.I. Pigment Blue 15:3
  Magenta Pigment: C.I. Pigment Red 122
  Yellow pigment: C.I. Pigment Yellow 150
  White pigment: C.I. Pigment White 6
Resin
  JONCRYL 62J: styrene-acrylic resin emulsion, produced by BASF
  AQUACER 539: modified paraffin wax emulsion for aqueous system, produced by BYK 3.2. Measurement of Ink Viscosity The initial viscosity (mPa·s) of each of the inks prepared above was measured at a shear rate of 200 s$^{-1}$ with a rheometer MCR-300 (manufactured by Anton Paar). Subsequently, 5 mass % calcium acetate aqueous solution and the ink were mixed in a ratio of 1:2, and 6 mL of the mixture was shaken 20 times in a sample tube. Then, the resulting mixture was subjected to viscosity measurement to obtain the viscosity at the time of mixing with flocculant. The viscosity at the time of mixing with flocculant was divided by the initial viscosity to obtain the ratio of the viscosity to the initial viscosity, that is, the viscosity increase factor.

3.3. Printing Method

Printing was performed by using the treatment liquids shown in Table 1 and the inks shown in Table 2. An ink jet printer SC-580650 (manufactured by Seiko Epson) equipped with a head having 12 nozzle lines was prepared as the printing apparatus. The nozzle lines of the head of the ink jet printer were assigned as nozzles 1 to nozzles 12 in order from the nozzle line at one end in the scanning direction to the nozzle line at the other end, and the nozzles were filled with the treatment liquid and the inks, as shown in Table 3.

For the arrangements not using Ink 8 that is a white ink, Head 1 represents the nozzle arrangement as shown in FIG. 3, and Head 2 represents the nozzle arrangement as shown in FIG. 4. In Head 2, the nozzles in the two lines at one end are assigned as treatment liquid nozzles, and these treatment liquid nozzles lie upstream in the sub-scanning direction as with the treatment liquid nozzles 26 in FIG. 4.

For the arrangements using Ink 8, Head 1 represents the nozzle arrangement as shown in FIG. 5. In the arrangements using Ink 8, also, Head 2 represents the arrangement in which the treatment liquid nozzles are disposed upstream of the ink nozzles in the sub-scanning direction, as shown in FIG. 4, and in which the ink nozzles arranged as shown in FIG. 4 are arranged in such a manner that some of the ink nozzles are located upstream of the other in the sub-scanning direction, as shown in FIG. 5. In Head 2, the nozzles in the two lines at one end are assigned as treatment liquid nozzles, and these treatment liquid nozzles lie upstream in the sub-scanning direction as with the treatment liquid nozzles 26 in FIG. 4.

For the arrangements using Ink 8, the ink nozzles filled with Ink 8 are located upstream in the sub-scanning direction, and the ink nozzles filled with any of inks other than Ink 8 are located downstream in the sub-scanning direction.

In Head 1 for Arrangements 28 and 29, having the arrangement shown in FIG. 3, the treatment liquid nozzles are located only in the upper half region in the Figure, and the ink nozzles are located only in the lower half region. In these arrangements, the treatment liquid nozzles do not have any coincide portion with the ink nozzles in the sub-scanning direction; hence, the treatment liquid and the inks are not simultaneously applied onto the printing medium.

TABLE 3

| Arrangement | Head | Nozzles 1 | Nozzles 2 | Nozzles 3 | Nozzles 4 | Nozzles 5 | Nozzles 6 | Nozzles 7 | Nozzles 8 | Nozzles 9 | Nozzles 10 | Nozzles 11 | Nozzles 12 |
|---|---|---|---|---|---|---|---|---|---|---|---|---|---|
| Arrangement 1 | 1 | Treatment liquid | Ink 6 | Ink 2 | Ink 3 | Ink 4 | Ink 1 | Ink 1 | Ink 4 | Ink 3 | Ink 2 | Ink 7 | Treatment liquid |
| Arrangement 2 | 1 | Treatment liquid | Ink 8 | Ink 2 | Ink 3 | Ink 4 | Ink 1 | Ink 1 | Ink 4 | Ink 3 | Ink 2 | Ink 8 | Treatment liquid |
| Arrangement 3 | 1 | Treatment liquid | Ink 2 | Ink 3 | Ink 4 | Ink 1 | Ink 6 | Ink 7 | Ink 1 | Ink 4 | Ink 3 | Ink 2 | Treatment liquid |
| Arrangement 4 | 1 | Treatment liquid | Ink 2 | Ink 3 | Ink 4 | Ink 1 | Ink 8 | Ink 8 | Ink 1 | Ink 4 | Ink 3 | Ink 2 | Treatment liquid |
| Arrangement 5 | 1 | Ink 1 | Ink 4 | Ink 3 | Ink 2 | Ink 6 | Treatment liquid | Treatment liquid | Ink 7 | Ink 2 | Ink 3 | Ink 4 | Ink 1 |
| Arrangement 6 | 1 | Ink 1 | Ink 4 | Ink 3 | Ink 2 | Ink 8 | Treatment liquid | Treatment liquid | Ink 8 | Ink 2 | Ink 3 | Ink 4 | Ink 1 |
| Arrangement 7 | 1 | Ink 1 | Ink 4 | Ink 3 | Ink 2 | Ink 8 | Treatment liquid | Treatment liquid | Ink 5 | Ink 2 | Ink 3 | Ink 4 | Ink 1 |
| Arrangement 8 | 1 | Ink 1 | Ink 4 | Ink 3 | Ink 2 | Ink 8 | Treatment liquid | Treatment liquid | Ink 9 | Ink 2 | Ink 3 | Ink 4 | Ink 1 |
| Arrangement 9 | 1 | Ink 6 | Ink 1 | Ink 4 | Ink 3 | Ink 2 | Treatment liquid | Treatment liquid | Ink 2 | Ink 3 | Ink 4 | Ink 1 | Ink 7 |
| Arrangement 10 | 1 | Ink 8 | Ink 1 | Ink 4 | Ink 3 | Ink 2 | Treatment liquid | Treatment liquid | Ink 2 | Ink 3 | Ink 4 | Ink 1 | Ink 8 |
| Arrangement 11 | 1 | Treatment liquid | Treatment liquid | Ink 6 | Ink 7 | Ink 2 | Ink 2 | Ink 3 | Ink 3 | Ink 4 | Ink 4 | Ink 1 | Ink 1 |
| Arrangement 12 | 1 | Treatment liquid | Treatment liquid | Ink 8 | Ink 8 | Ink 2 | Ink 2 | Ink 3 | Ink 3 | Ink 4 | Ink 4 | Ink 1 | Ink 1 |
| Arrangement 13 | 1 | Treatment liquid | Treatment liquid | Ink 2 | Ink 2 | Ink 3 | Ink 3 | Ink 4 | Ink 4 | Ink 1 | Ink 1 | Ink 6 | Ink 7 |
| Arrangement 14 | 1 | Treatment liquid | Treatment liquid | Ink 2 | Ink 2 | Ink 3 | Ink 3 | Ink 4 | Ink 4 | Ink 1 | Ink 1 | Ink 8 | Ink 8 |
| Arrangement 15 | 2 | Treatment liquid | Treatment liquid | Ink 6 | Ink 7 | Ink 2 | Ink 2 | Ink 3 | Ink 3 | Ink 4 | Ink 4 | Ink 1 | Ink 1 |
| Arrangement 16 | 2 | Treatment liquid | Treatment liquid | Ink 8 | Ink 8 | Ink 2 | Ink 2 | Ink 3 | Ink 3 | Ink 4 | Ink 4 | Ink 1 | Ink 1 |
| Arrangement 17 | 2 | Treatment liquid | Treatment liquid | Ink 2 | Ink 2 | Ink 3 | Ink 3 | Ink 4 | Ink 4 | Ink 1 | Ink 1 | Ink 6 | Ink 7 |
| Arrangement 18 | 2 | Treatment liquid | Treatment liquid | Ink 2 | Ink 2 | Ink 3 | Ink 3 | Ink 4 | Ink 4 | Ink 1 | Ink 1 | Ink 8 | Ink 8 |
| Arrangement 19 | 1 | Treatment liquid | Treatment liquid | Ink 6 | Ink 2 | Ink 3 | Ink 4 | Ink 1 | Ink 1 | Ink 4 | Ink 3 | Ink 2 | Ink 7 |
| Arrangement 20 | 1 | Treatment liquid | Treatment liquid | Ink 8 | Ink 2 | Ink 3 | Ink 4 | Ink 1 | Ink 1 | Ink 4 | Ink 3 | Ink 2 | Ink 8 |
| Arrangement 21 | 1 | Treatment liquid | Treatment liquid | Ink 2 | Ink 3 | Ink 4 | Ink 1 | Ink 6 | Ink 7 | Ink 1 | Ink 4 | Ink 3 | Ink 2 |
| Arrangement 22 | 1 | Treatment liquid | Treatment liquid | Ink 2 | Ink 3 | Ink 4 | Ink 1 | Ink 8 | Ink 8 | Ink 1 | Ink 4 | Ink 3 | Ink 2 |
| Arrangement 23 | 1 | Treatment liquid | Ink 3 | Ink 2 | Ink 4 | Ink 1 | Ink 6 | Ink 7 | Ink 1 | Ink 4 | Ink 2 | Ink 3 | Treatment liquid |
| Arrangement 24 | 1 | Ink 6 | Ink 1 | Ink 4 | Ink 2 | Ink 3 | Treatment liquid | Treatment liquid | Ink 3 | Ink 2 | Ink 4 | Ink 1 | Ink 7 |
| Arrangement 25 | 1 | Treatment liquid | Treatment liquid | Ink 3 | Ink 3 | Ink 2 | Ink 2 | Ink 4 | Ink 4 | Ink 1 | Ink 1 | Ink 6 | Ink 7 |
| Arrangement 26 | 1 | Treatment liquid | Treatment liquid | Ink 3 | Ink 2 | Ink 4 | Ink 1 | Ink 6 | Ink 7 | Ink 1 | Ink 4 | Ink 2 | Ink 3 |
| Arrangement 27 | 1 | Ink 6 | Ink 1 | Ink 2 | Ink 3 | Ink 4 | Treatment liquid | Treatment liquid | Ink 4 | Ink 3 | Ink 2 | Ink 1 | Ink 7 |
| Arrangement 28 | 1 | Treatment liquid | Ink 6 | Ink 2 | Ink 3 | Ink 4 | Ink 1 | Ink 1 | Ink 4 | Ink 3 | Ink 2 | Ink 7 | Treatment liquid |
| Arrangement 29 | 1 | Treatment liquid | Ink 3 | Ink 2 | Ink 4 | Ink 1 | Ink 6 | Ink 7 | Ink 1 | Ink 4 | Ink 2 | Ink 3 | Treatment liquid |
| Arrangement 30 | 1 | Treatment liquid | Ink 6 | Ink 10 | Ink 3 | Ink 4 | Ink 1 | Ink 1 | Ink 4 | Ink 3 | Ink 10 | Ink 7 | Treatment liquid |

Four types of printing medium were prepared as follows:
Printing Medium
 M1: IJ180Cv3-10, polyvinyl chloride film for indoor/outdoor signs, manufactured by 3M
 M2: DV662, vinyl chloride resin wallpaper, produced by Neschen
 M3: 3686 Trisolv Prime Art Paper, coated paper produced by Sihl
 M4: XEROX P, plain paper manufactured by Fuji Xerox Printing in each Example was performed under the conditions shown in Table 4 or 5. The resolution of printing was 720 dpi×1440 dpi. The dot size of ink was 20 ng/dot. The percentage of the treatment liquid applied with respect to the ink applied is represented on a mass basis. The amount and dot density of the treatment liquid or inks applied were adjusted so that the percentage shown in the Table could be obtained. For printing a pattern, Ink 8 (white ink) was applied at a rate of 15 mg/inch$^2$, and Ink 9 (clear ink) was applied at a rate of 2 mg/inch$^2$. Inks other than Inks 8 and 9 are applied each in an even amount and at a rate of 15 mg/inch$^2$ in total.

In the Examples using Ink 8, the treatment liquid and Ink 8 were first applied by scanning, and then, the treatment liquid and the other inks were applied onto the image of Ink 8 by further scanning, thus forming a printed pattern.

The treatment liquid and the inks were applied by scanning 8 times. In the Examples using Ink 8, the treatment liquid and Ink 8 were applied with scanning 8 times, and the treatment liquid and the inks other than Ink 8 were applied with scanning another 8 times.

The nozzle density of the nozzles was 360 dpi. The temperature (° C.) of the nozzle face was controlled to the temperature shown in Table 4 or 5 with a thermocouple attached to the nozzle plate.

Two values are given to the proportion (percentage) of the treatment liquid to the inks in some Examples in Tables 4 and 5. For the Examples using Ink 8, one is the percentage of the mass of the treatment liquid applied before the scanning for applying Ink 8 to the mass of Ink 8, and the other is the percentage of the mass of the treatment liquid applied by the scanning for applying the treatment liquid and the inks other than Ink 8 to the mass of the inks other than Ink 8.

In Example 28 shown in Table 4, Ink 8 was not used. In this Example, the upper half of the treatment liquid nozzles ejected the treatment liquid to apply it in a proportion of 33% by mass relative to the inks, and the lower half of the treatment liquid nozzles in the sub-scanning direction ejected the treatment liquid to apply it in a proportion of 17% by mass relative to the inks.

The maximum period (s) for one scan (one time of scanning) was adjusted by varying the width (distance in the scanning direction) of the printing medium by cutting the printing medium or adding a further width to the printing medium. More specifically, when the maximum period for one scan was 1.7 s, the width of the printing medium was set to 120 cm. Similarly, when the maximum period for one scan was 2.2 s, the width of the printing medium was set to 160 cm; when the maximum period for one scan was 1.0 s, the width of the printing medium was set to 71 cm; when the maximum period for one scan was 0.5 s, the width of the printing medium was set to 36 cm.

TABLE 4

|  | Example 1 | Example 2 | Example 3 | Example 4 | Example 5 | Example 6 | Example 7 | Example 8 | Example 9 |
|---|---|---|---|---|---|---|---|---|---|
| Head arrangement | Arrangement 1 | Arrangement 2 | Arrangement 3 | Arrangement 4 | Arrangement 5 | Arrangement 5 | Arrangement 5 | Arrangement 6 | Arrangement 7 |
| Treatment liquid | Treatment liquid A | Treatment liquid A | Treatment liquid A | Treatment liquid A | Treatment liquid A | Treatment liquid B | Treatment liquid C | Treatment liquid A | Treatment liquid A |
| Proportion of treatment liquid to ink (mass basis) | 25% | 25%/25% | 25% | 25%/25% | 25% | 25% | 25% | 25%/25% | 25%/25% |
| Nozzle face temperature (° C.) | 35° C. | 35° C. | 35° C. | 35° C. | 35° C. | 35° C. | 35° C. | 35° C. | 35° C. |
| Printing medium | M1 | M1 | M1 | M1 | M1 | M1 | M1 | M1 | M1 |
| Maximum period for one scan (s) | 1.7 s | 1.7 s | 1.7 s | 1.7 s | 1.7 s | 1.7 s | 1.7 s | 1.7 s | 1.7 s |
| Recovery from clogging | A | B | B | B | A | A | B | B | C |
| Unevenness in bleeding | A | A | A | A | B | B | A | B | B |
| Band-like unevenness | B | B | B | B | A | A | A | A | A |
| Colored Band-like unevenness in color | A | A | A | A | A | A | A | A | A |

|  | Example 10 | Example 11 | Example 12 | Example 13 | Example 14 | Example 15 | Example 16 |
|---|---|---|---|---|---|---|---|
| Head arrangement | Arrangement 8 | Arrangement 9 | Arrangement 10 | Arrangement 11 | Arrangement 12 | Arrangement 13 | Arrangement 14 |
| Treatment liquid | Treatment liquid A | Treatment liquid A | Treatment liquid A | Treatment liquid A | Treatment liquid A | Treatment liquid A | Treatment liquid A |
| Proportion of treatment liquid to ink (mass basis) | 25%/25% | 25% | 25%/25% | 25% | 25%/25% | 25% | 25%/25% |
| Nozzle face temperature (° C.) | 35° C. | 35° C. | 35° C. | 35° C. | 35° C. | 35° C. | 35° C. |
| Printing medium | M1 | M1 | M1 | M1 | M1 | M1 | M1 |
| Maximum period for one scan (s) | 1.7 s | 1.7 s | 1.7 s | 1.7 s | 1.7 s | 1.7 s | 1.7 s |
| Recovery from clogging | C | B | B | A | B | B | B |
| Unevenness in bleeding | B | B | B | B | B | B | B |
| Band-like unevenness | A | A | A | C | C | C | C |
| Colored Band-like unevenness in color | A | A | A | B | B | C | C |

TABLE 4-continued

|  | Example 17 | Example 18 | Example 19 | Example 20 | Example 21 | Example 22 | Example 23 | Example 24 | Example 25 |
|---|---|---|---|---|---|---|---|---|---|
| Head arrangement | Arrangement 15 | Arrangement 16 | Arrangement 17 | Arrangement 18 | Arrangement 19 | Arrangement 20 | Arrangement 21 | Arrangement 22 | Arrangement 9 |
| Treatment liquid | Treatment liquid A | Treatment liquid A | Treatment liquid A | Treatment liquid A | Treatment liquid A | Treatment liquid A | Treatment liquid A | Treatment liquid A | Treatment liquid A |
| Proportion of treatment liquid to ink (mass basis) | 10% | 10%/10% | 10% | 10%/10% | 25% | 25%/25% | 25% | 25%/25% | 25% |
| Nozzle face temperature (° C.) | 35° C. | 35° C. | 35° C. | 35° C. | 35° C. | 35° C. | 35° C. | 35° C. | 25° C. |
| Printing medium | M1 | M1 | M1 | M1 | M1 | M1 | M1 | M1 | M1 |
| Maximum period for one scan (s) | 1.7 s | 1.7 s | 1.7 s | 1.7 s | 1.7 s | 1.7 s | 1.7 s | 1.7 s | 1.7 s |
| Recovery from clogging | A | A | A | A | A | B | B | B | A |
| Unevenness from bleeding | A | A | A | A | B | B | B | B | C |
| Band-like unevenness | A | A | A | A | C | C | C | C | B |
| Colored Band-like unevenness in color | B | B | B | B | A | A | A | A | A |

|  | Example 26 | Example 27 | Example 28 | Example 29 | Example 30 | Example 31 | Example 32 |
|---|---|---|---|---|---|---|---|
| Head arrangement | Arrangement 9 | Arrangement 9 | Arrangement 9 | Arrangement 10 | Arrangement 9 | Arrangement 9 | Arrangement 9 |
| Treatment liquid | Treatment liquid A | Treatment liquid A | Treatment liquid A | Treatment liquid A | Treatment liquid A | Treatment liquid A | Treatment liquid A |
| Proportion of treatment liquid to ink (mass basis) | 25% | 10% | 33%/17% | 33%/17% | 25% | 25% | 25% |
| Nozzle face temperature (° C.) | 45° C. | 35° C. | 35° C. | 35° C. | 35° C. | 35° C. | 35° C. |
| Printing medium | M1 | M1 | M1 | M1 | M2 | M3 | M4 |
| Maximum period for one scan (s) | 1.7 s | 1.7 s | 1.7 s | 1.7 s | 1.7 s | 1.7 s | 1.7 s |
| Recovery from clogging | C | A | C | C | B | B | B |
| Unevenness from bleeding | A | C | A | A | B | B | A |
| Band-like unevenness | A | B | A | A | B | B | A |
| Colored Band-like unevenness in color | A | A | A | A | A | A | A |

TABLE 5

|  | Example 33 | Example 34 | Example 35 | Example 36 | Example 37 | Example 38 | Example 39 | Example 40 |
|---|---|---|---|---|---|---|---|---|
| Head arrangement | Arrangement 13 | Arrangement 9 | Arrangement 16 | Arrangement 27 | Arrangement 13 | Arrangement 13 | Arrangement 13 | Arrangement 30 |
| Treatment liquid | Treatment liquid A | Treatment liquid A | Treatment liquid A | Treatment liquid A | Treatment liquid A | Treatment liquid A | Treatment liquid A | Treatment liquid A |
| Proportion of treatment liquid to ink (mass basis) | 25% | 40% | 25%/25% | 25% | 25% | 25% | 25% | 25% |
| Nozzle face temperature (° C.) | 35° C. | 35° C. | 35° C. | 35° C. | 35° C. | 35° C. | 35° C. | 35° C. |
| Printing medium | M4 | M1 | M1 | M1 | M1 | M1 | M1 | M1 |
| Maximum period for one scan (s) | 1.7 s | 1.7 s | 1.7 s | 1.7 s | 2.2 s | 1.0 s | 0.5 s | 1.7 s |
| Recovery from clogging | B | C | B | C | C | B | A | A |
| Unevenness in bleeding | A | A | A | B | B | B | B | C |
| Band-like unevenness | A | A | A | A | C | B | A | B |

TABLE 5-continued

| | Comparative Example 1 | Comparative Example 2 | Comparative Example 3 | Comparative Example 4 | Comparative Example 5 | Reference Example 1 | Reference Example 2 | Reference Example 3 |
|---|---|---|---|---|---|---|---|---|
| Colored Band-like unevenness in color | A | A | B | A | C | B | A | B |
| Head arrangement | Arrangement 1 | Arrangement 23 | Arrangement 24 | Arrangement 25 | Arrangement 26 | Arrangement 28 | Arrangement 29 | Arrangement 1 |
| Treatment liquid | — | Treatment liquid A | Treatment liquid A | Treatment liquid A | Treatment liquid A | Treatment liquid A | Treatment liquid A | — |
| Proportion of treatment liquid to ink (mass basis) | — | 25% | 25% | 25% | 25% | 25% | 25% | — |
| Nozzle face temperature (° C.) | 50° C. | 35° C. | 35° C. | 35° C. | 35° C. | 35° C. | 35° C. | 25° C. |
| Printing medium | M1 | M1 | M1 | M1 | M1 | M1 | M1 | M1 |
| Maximum period for one scan (s) | 1.7 s | 1.7 s | 1.7 s | 1.7 s | 1.7 s | 1.7 s | 1.7 s | 1.7 s |
| Recovery from clogging | D | D | D | D | D | A | B | A |
| Unevenness in bleeding | A | A | B | B | B | A | A | D |
| Band-like unevenness | A | B | A | C | C | A | A | A |
| Colored Band-like unevenness in color | A | A | A | C | A | A | A | A |

3.4. Evaluation 3.4.1. Recovery from Clogging

A solid pattern was continuously printed for one hour with the above-described ink jet printer filled with the treatment liquid and the inks, followed by cleaning three times. Then, the percentage of nozzles that failed in ejection was calculated. The result was rated according the criteria described later herein. The results rated as C or higher were determined to be no problem. The percentage of nozzles that failed in ejection was obtained by counting only the nozzles adjacent to the treatment liquid nozzles. For example, for Arrangement 1 in which nozzles 1 and nozzles 12 were filled with the treatment liquid, the two lines of nozzles 2 and nozzles 11 were examined, and the percentage of nozzles that failed in ejection in these two lines was calculated. For Arrangement 5, the two lines of nozzles 5 and nozzles 8 were examined, and the percentage of nozzles that failed in ejection in these two lines was calculated. For Arrangement 11, only nozzles 3 were examined, and the percentage of nozzles that failed in ejection in the line of nozzles 3 was calculated.

The solid pattern was printed by printing, at intervals of 1 cm, many strips (each having a width of 1 cm in the sub-scanning direction) extending across the printable region of the printing medium in the scanning direction. Such a pattern was continuously printed for one hour. In this printing, all the nozzles were subjected to flushing for each pass. After printing, the nozzles were cleaned by suction.

Criteria:
A: There was no nozzle that failed in ejection.
B: 1% to less than 2% of the nozzles failed in ejection.
C: 2% to less than 7% of the nozzles failed in ejection.
D: 7% or more of the nozzles failed in ejection.

3.4.2. Unevenness Resulting from Bleeding

The portion (strip) of the solid pattern printed in 3.4.1. formed 10 minutes after the start of printing was visually observed. When the observed portion had small spots of ink colors and was thus uneven, such spots were determined to be an unevenness resulting from bleeding. The results rated as C or higher were determined to be no problem.

Criteria:
A: No unevenness resulting bleeding was observed.
B: An unevenness resulting from bleeding was slightly observed but was not clear.
C: An unevenness resulting from bleeding was visible to some extent but was considered to be no problem.
D: There was a clearly visible unevenness resulting from bleeding.

3.4.3. Band-Like Unevenness

A solid pattern of 1 m in width (distance in the sub-scanning direction) extending across the printable region of the printing medium in the scanning direction was printed with the above-described ink jet printer filled with the treatment liquid and the inks. The resulting solid pattern was visually observed. A band or strip resulting from inconsistency of ink color density observed in the printed pattern was determined to be a band-like unevenness, and the printed pattern was rated according to the following criteria. The results rated as B or higher were determined to be no problem.

Criteria:
A: Band-like unevenness was not clearly visible.
B: A band-like unevenness was visible to some extent but was considered to be no problem.
C: There was a clearly visible band-like unevenness.

3.4.4. Colored Band-Like Unevenness

The solid pattern printed in 3.4.3. was visually observed. A band or strip that seemed to have a different color observed in the printed pattern was determined to be a colored band-like unevenness, and the printed pattern was rated according to the following criteria. The results rated as B or higher were determined to be no problem.

Criteria:
A: Colored band-like unevenness was not clearly visible.
B: A colored band-like unevenness was visible to some extent but was considered to be no problem.
C: There was a clearly visible colored band-like unevenness.

3.5. Evaluation Results

The results of the evaluation are shown in Tables 4 and 5.

In each of the Examples, the viscosity of the ink used in the ink nozzles closest to the treatment liquid nozzles was increased by a factor of 6.0 or less, the nozzles were able to be satisfactorily recovered from clogging and exhibited reduced clogging. In contrast, in the Comparative Examples, the recovery from clogging was insufficient. Evaluation results will be described in detail below.

Of Examples 1 to 4 in which the treatment liquid nozzles were disposed at both ends of the head, Example 1 exhibited the best recovery from clogging. In Example 1, ink nozzles adjacent to the treatment liquid nozzles were filled with Ink 6 or 7 that exhibited a viscosity increase by a small factor.

According to the results of Examples 5 to 7, treatment liquids A and B were effective in recover from clogging and treatment liquid C was effective in reducing unevenness resulting from bleeding.

In comparison between Examples 8 to 12 in which treatment liquid nozzles were arranged in the central region of the head and Examples 1 to 4, the arrangements of Examples 8 to 12 were superior in terms of reducing band-like unevenness.

Also, in comparison between Examples 13 to 16 in which treatment liquid nozzles were arranged on one end of the head and Examples 1 to 4 in which the arrangement of the treatment liquid nozzles was varied from the foregoing arrangement, the arrangements of Examples 1 to 4 were effective in reducing band-like unevenness.

In Examples 21 to 24, ink nozzles filled with color inks were arranged in a bilaterally symmetrical manner in terms of color. These arrangements were more effective than the asymmetrical arrangements of Examples 13 to 16 in reducing band-like unevenness.

In Examples 17 to 20 in which the treatment liquid nozzles were arranged only at one end of the head in the arrangement shown in FIG. 4 and, in addition, in which the nozzles filled with color inks were arranged in a bilaterally symmetrical manner in terms of color, image quality was improved in spite of the amount of treatment liquid that was smaller than that in Examples 13 to 16. In addition, since the amount of treatment liquid was smaller, the mist of treatment liquid was reduced, and clogging was reduced accordingly.

The results of Examples 11 and 25 suggest that when the nozzle face is present at room temperature, nozzles are recovered from clogging more effectively, while unevenness resulting from bleeding is inferior. The results of Examples 11 and 26 suggest that when the nozzle face temperature is increased, recovery from clogging becomes inferior, while unevenness resulting from bleeding is reduced.

The results of Examples 11 and 27 suggest that when the amount of treatment liquid was reduced in the nozzle arrangement shown in FIG. 3, image quality is reduced.

In comparison between Examples 28 and 11 and between Examples 29 and 12, unevenness resulting from bleeding was reduced more effectively in the case where the treatment liquid in the treatment liquid nozzles located upstream in the sub-scanning direction was applied in a larger amount. The ink nozzles coincident in position in the sub-scanning direction with the upstream treatment liquid nozzles were inferior particularly in terms of recovery from clogging.

Examples 30 to 33 produced high image quality independent of the absorbency of the printing medium. For the particularly absorbent printing medium, there were no problems with image quality.

The results of Examples 11 and 34 suggest that when a larger amount of treatment liquid is applied, image quality is improved, while recovery from clogging is reduced. The results of Examples 18 and 35, in which the nozzles were arrangement as shown in FIG. 4, show that recovery from clogging was not so much reduced as that in Example 33 even though the amount of treatment liquid was increased.

The results of Examples 11 and 36 show that when ink nozzles adjacent to the treatment liquid nozzles were filled with Ink 4 exhibiting a viscosity increase by a large factor, recovery from clogging was reduced.

The results of Examples 37 to 40 suggest that the longer the period of one pass, the better the recovery from clogging. In Example 40 in which one of the inks contained glycerin, since glycerin hinders the ink from drying, recovery from clogging was improved, but unevenness resulting from bleeding was increased.

In Comparative Example 1, high image quality was produced in spite of using no treatment liquid unlike in the Examples, but recovery from clogging was reduced because the nozzle face temperature was high. The results of Comparative Examples 2 to 5, in which ink nozzles adjacent to the treatment liquid nozzles were filled with an ink that exhibited a viscosity increase by a large factor, show that recovery from clogging was reduced.

In Reference Examples 1 and 2 in which the treatment liquid nozzles were not coincident in position in the sub-scanning direction with any nozzle lines, nozzles were recovered from clogging without problems even though the ink nozzles adjacent to the treatment liquid nozzles were filled with an ink that exhibited a viscosity increase by a large factor. In Reference Example 3 which is the case of using no treatment liquid and a low nozzle face temperature, nozzles were recovered from clogging without problems, but unevenness resulting from bleeding was increased.

The implementation of the subject matter disclosed herein is not limited to the above-described embodiments, and various modifications may be made. For example, the subject matter disclosed herein may be implemented in substantially the same manner as any of the disclosed embodiments (for example, in terms of function, method, and results, or in terms of purpose and effect). Some elements used in the disclosed embodiments but not essential may be replaced. Implementations producing the same effect as produced in the disclosed embodiments or achieving the same object as in the disclosed embodiments are also within the scope of the subject matter of the present disclosure. A combination of any of the disclosed embodiments with a known art is also within the scope of the subject matter of the present disclosure.

What is claimed is:

1. An ink jet printing method comprising:
   heating a printing medium:
   scanning the printing medium, which is poorly or not absorbent of ink, in a scanning direction a plurality of times with an ink jet head from which inks and a treatment liquid acting to flocculate one or more constituents of the inks are ejected, the ink jet head including:
   first ink nozzles filled with an ink and arranged in a sub-scanning direction intersecting the scanning direction;
   second ink nozzles filled with an ink having a different composition from the ink of the first ink nozzles, the second ink nozzles being arranged in the sub-scanning direction; and
   treatment liquid nozzles filled with the treatment liquid and arranged in the sub-scanning direction, at least some of the treatment liquid nozzles being coincident in position in the sub-scanning direction with the first and the second ink nozzles, wherein the first ink nozzles are the closest of the ink nozzles to the treatment liquid nozzles in the scanning direction, and the second ink nozzles are arranged opposite the treatment liquid nozzles in the scanning direction with respect to the first ink nozzles, wherein the treatment liquid nozzles are in an arrangement in the central one-third in the scanning direction of all the nozzles, wherein the printing medium is heated so that the ink of the first ink nozzles, the ink of the second ink nozzles and the treatment liquid are each elected onto a heated printing medium, wherein when the ink of the first ink nozzles is mixed with a solution of 5% by mass of calcium acetate in water in a ratio of 2:1, the ink of the first ink nozzles exhibits a viscosity increased by a factor of 6.0 or less relative to the viscosity before being mixed, wherein when the ink of the second ink nozzles is mixed with a solution of 5% by mass of calcium acetate in water in a ratio of 2:1, the ink of the second ink nozzles exhibits a viscosity increased by a factor of more than 6.0 relative to the viscosity before being mixed.

2. The ink jet printing method according to claim 1, wherein
when the ink of the first ink nozzles is mixed with a solution of 5% by mass of calcium acetate in water in a ratio of 2:1, the ink of the first ink nozzles exhibits a viscosity increased by a factor of 3.5 or less relative to the viscosity before being mixed.

3. The ink jet printing method according to claim 1, wherein
the treatment liquid is applied onto a printing region of the printing medium in a proportion from 20% by mass to 50% by mass relative to the mass of the inks applied onto the printing region.

4. The ink jet printing method according to claim 1, wherein
the ink of the first ink nozzles is a pale ink composition, and the ink of the second ink nozzles is of the same color type as the pale ink composition and is different in color density from the pale ink composition.

5. The ink jet printing method according to claim 1, wherein
the ink of the first ink nozzles is a clear ink composition, and the ink of the second ink nozzles is a coloring ink composition containing a coloring material.

6. The ink jet printing method according to claim 1, wherein
the ink of the first ink nozzles is a white ink composition containing a white coloring material, and the ink of the second ink nozzles is a non-white ink composition containing a non-white coloring material.

7. The ink jet printing method according to claim 1, wherein
the ink jet head further includes third ink nozzles filled with an ink and arranged in the sub-scanning direction, the third ink nozzles being located opposite the first ink nozzles in the scanning direction with respect to the treatment liquid nozzles, the third ink nozzles being the closest of the ink nozzles opposite the first ink nozzles to the treatment liquid nozzles in the scanning direction,
wherein
when the ink of the third ink nozzles is mixed with a solution of 5% by mass of calcium acetate in water in a ratio of 2:1, the ink of the third ink nozzles exhibits a viscosity increased by a factor of 6.0 or less relative to the viscosity before being mixed.

8. The ink jet printing method according to claim 1, wherein
the ink jet head further includes ink nozzles filled with an ink opposite the first ink nozzles in the scanning direction with respect to the treatment liquid nozzles, the ink nozzles opposite the first ink nozzles including:
third ink nozzles located closest to the treatment liquid nozzles in the scanning direction; and
fourth ink nozzles located opposite the treatment liquid nozzles in the scanning direction with respect to the third ink nozzles,
wherein
when the ink of the third ink nozzles is mixed with a solution of 5% by mass of calcium acetate in water in a ratio of 2:1, the ink of the third ink nozzles exhibits a viscosity increased by a factor of 6.0 or less relative to the viscosity before being mixed, and when the ink of the fourth ink nozzles is mixed with a solution of 5% by mass of calcium acetate in water in a ratio of 2:1, the ink of the fourth ink nozzles exhibits a viscosity increased by a factor of more than 6.0 relative to the viscosity before being mixed.

9. The ink jet printing method according to claim 1, wherein
the ink jet head has a nozzle face at which the nozzles are arranged, and the nozzle face has a temperature of 28° C. to 50° C. when the inks are applied.

10. The ink jet printing method according to claim 1, wherein
one time of the scanning has a maximum period of 0.8 s or more.

11. The ink jet printing method according to claim 1, wherein
the treatment liquid contains at least one of cationic resins, organic acids, and multivalent metal salts as a flocculant.

12. The ink jet printing method according to claim 1, wherein
the ink of the first ink nozzles and the ink of the second ink nozzles contain a polyol having a normal boiling point of 280° C. or more as an organic solvent with a content of 1% by mass or less relative to the total mass of the ink.

13. The ink jet printing method according to claim 1, wherein
in the scanning of the printing medium performed in the scanning direction a plurality of times, the treatment liquid is ejected from the portions of the treatment liquid nozzles coincident in position in the sub-scanning direction with the first and the second ink nozzles, and inks are ejected from the portions of the first and the second ink nozzles coincident in position in the sub-scanning direction with the treatment liquid nozzles.

14. The ink jet printing method according to claim 1, wherein the treatment liquid nozzles are in an arrangement in the central one-fourth in the scanning direction of all the nozzles.

15. The ink jet printing method according to claim 1, wherein the printing medium that is poorly absorbent of ink is provided with a coating layer configured to receive an ink on a surface thereof, and a base material of the printing medium that is poorly absorbent of ink is paper or a plastic film.

16. The ink jet printing method according to claim 1, wherein the printing medium that is not absorbent of ink is a plastic film that does not have an ink-absorbing layer, or a paper sheet coated or bonded with a plastic film.

17. The ink jet printing method according to claim 1, wherein the heating is conducted by an infrared (IR) heater or a platen heater.

18. The ink jet printing method according to claim 1, wherein a surface temperature of the heated printing medium is 45 degrees C. or less.

19. An ink jet printing apparatus comprising:
a heater configured to heat a printing medium that is poorly or not absorbent of ink,
an ink jet head operable to eject inks and a treatment liquid acting to flocculate one or more constituents of the inks while scanning the printing medium in a scanning direction a plurality of times, the ink jet head including:
first ink nozzles to be filled with an ink, the first nozzles being arranged in a sub-scanning direction intersecting the scanning direction;
second ink nozzles to be filled with an ink having a different composition from the ink of the first ink nozzles, the second ink nozzles being arranged in the sub-scanning direction; and
treatment liquid nozzles to be filled with the treatment liquid, the treatment liquid nozzles being arranged in the sub-scanning direction, at least some of the treatment liquid nozzles being coincident in position in the sub-scanning direction with the first and the second ink nozzles,
wherein the first ink nozzles are the closest of the ink nozzles to the treatment liquid nozzles in the scanning direction, and the second ink nozzles are arranged opposite the treatment liquid nozzles in the scanning direction with respect to the first ink nozzles,
wherein the treatment liquid nozzles are in an arrangement in the central one-third in the scanning direction of all the nozzles,
wherein the heater is configured to heat the printing medium so that the ink of the first ink nozzles, the ink of the second ink nozzles, and the treatment liquid are each ejected onto a heated printing medium,
wherein when the ink of the first ink nozzles is mixed with a solution of 5% by mass of calcium acetate in water in a ratio of 2:1, the ink of the first ink nozzles exhibits a viscosity increased by a factor of 6.0 or less relative to the viscosity before being mixed,
wherein when the ink of the second ink nozzles is mixed with a solution of 5% by mass of calcium acetate in water in a ratio of 2:1, the ink of the second ink nozzles exhibits a viscosity increased by a factor of more than 6.0 relative to the viscosity before being mixed.

20. An ink jet head operable to eject inks and a treatment liquid acting to flocculate one or more constituents of the inks while scanning a printing medium that is poorly or not absorbent of ink in a scanning direction a plurality of times, the ink jet head comprising:
a heater configured to heat the printing medium,
first ink nozzles to be filled with an ink, the first nozzles being arranged in a sub-scanning direction intersecting the scanning direction;
second ink nozzles to be filled with an ink having a different composition from the ink of the first ink nozzles, the second ink nozzles being arranged in the sub-scanning direction; and
treatment liquid nozzles to be filled with a treatment liquid, the treatment liquid nozzles being arranged in the sub-scanning direction, at least some of the treatment liquid nozzles being coincident in position in the sub-scanning direction with the first and the second ink nozzles,
wherein the first ink nozzles are the closest of the ink nozzles to the treatment liquid nozzles in the scanning direction, and the second ink nozzles are arranged opposite the treatment liquid nozzles in the scanning direction with respect to the first ink nozzles,
wherein the treatment liquid nozzles are in an arrangement in the central one-third in the scanning direction of all the nozzles,
wherein the heater is configured to heat the printing medium so that the ink of the first ink nozzles, the ink of the second ink nozzles and the treatment liquid are each ejected onto a heated printing medium,
wherein when the ink of the first ink nozzles is mixed with a solution of 5% by mass of calcium acetate in water in a ratio of 2:1, the ink of the first ink nozzles exhibits a viscosity increased by a factor of 6.0 or less relative to the viscosity before being mixed, and
wherein when the ink of the second ink nozzles is mixed with a solution of 5% by mass of calcium acetate in water in a ratio of 2.1, the ink of the second ink nozzles exhibits a viscosity increased by a factor of more than 6.0 relative to the viscosity before being mixed.

* * * * *